(12) United States Patent
Sakurai et al.

(10) Patent No.: US 9,113,144 B2
(45) Date of Patent: Aug. 18, 2015

(54) IMAGE PROCESSING SYSTEM, STORAGE MEDIUM, IMAGE PROCESSING METHOD, AND IMAGE PROCESSING APPARATUS FOR CORRECTING THE DEGREE OF DISPARITY OF DISPLAYED OBJECTS

(75) Inventors: Masahiro Sakurai, Chiyoda-Ku (JP); Satoshi Kodaira, Chiyoda-ku (JP)

(73) Assignee: NINTENDO CO., LTD., Kyoto (JP)

( * ) Notice: Subject to any disclaimer, the term of this patent is extended or adjusted under 35 U.S.C. 154(b) by 294 days.

(21) Appl. No.: 13/329,984

(22) Filed: Dec. 19, 2011

(65) Prior Publication Data

US 2012/0169723 A1 Jul. 5, 2012

(30) Foreign Application Priority Data

Dec. 29, 2010 (JP) ................................ 2010-294469

(51) Int. Cl.
G06T 15/00 (2011.01)
H04N 13/00 (2006.01)
H04N 13/02 (2006.01)

(52) U.S. Cl.
CPC ....... *H04N 13/0022* (2013.01); *H04N 13/0011* (2013.01); *H04N 13/0275* (2013.01); *H04N 13/0282* (2013.01)

(58) Field of Classification Search
None
See application file for complete search history.

(56) References Cited

U.S. PATENT DOCUMENTS

| 6,111,597 A | 8/2000 | Tabata |
| 2005/0195478 A1 | 9/2005 | Yanagawa et al. |
| 2005/0253924 A1 | 11/2005 | Mashitani |
| 2006/0152579 A1 | 7/2006 | Utsugi et al. |
| 2006/0232584 A1 | 10/2006 | Utsugi et al. |
| 2009/0219283 A1* | 9/2009 | Hendrickson et al. ........ 345/420 |
| 2010/0091093 A1* | 4/2010 | Robinson ........................ 348/47 |
| 2010/0239240 A1* | 9/2010 | Cameron et al. .............. 396/325 |
| 2011/0074770 A1* | 3/2011 | Robinson et al. ............. 345/419 |
| 2011/0090217 A1* | 4/2011 | Mashitani et al. ............ 345/419 |
| 2011/0157160 A1* | 6/2011 | Ushiki et al. .................. 345/419 |
| 2012/0069143 A1* | 3/2012 | Chu ................................ 348/43 |

FOREIGN PATENT DOCUMENTS

| JP | 10-188034 | 7/1998 |
| JP | 11-338457 | 12/1999 |
| JP | 2003-107603 | 4/2003 |
| JP | 2006-178900 | 7/2006 |

OTHER PUBLICATIONS

Lang et al., "Nonlinear Disparity Mapping for Stereoscopic 3D", ACM Transactions on Graphics, vol. 29, No. 4, Article 75, Jul. 26, 2010, 10 pages.
"Report on Experimental Framework for 3D Video Coding," International Organisation for Standardisation, http://mpeg.chiariglione.org/working_documents/explorations/3dav/experimental_framework.zip, Oct. 31, 2010, 10 pages.
May 24, 2012 Search Report for EP 11194320.5, 7 pages.

* cited by examiner

*Primary Examiner* — David Zarka
*Assistant Examiner* — Khoa Vu
(74) *Attorney, Agent, or Firm* — Nixon & Vanderhye P.C.

(57) ABSTRACT

Stereoscopic image generator configured to take images of a virtual three-dimensional space in which an object is located, with a virtual camera, and to generate a stereoscopic image that is composed of an image for a left eye and an image for a right eye between which a disparity is provided, and display controller for causing a display section to display the stereoscopic image generated by the stereoscopic image generator, are provided. In generating the stereoscopic image, the stereoscopic image generator performs correction of decreasing a disparity of the object.

17 Claims, 16 Drawing Sheets

FIG. 4
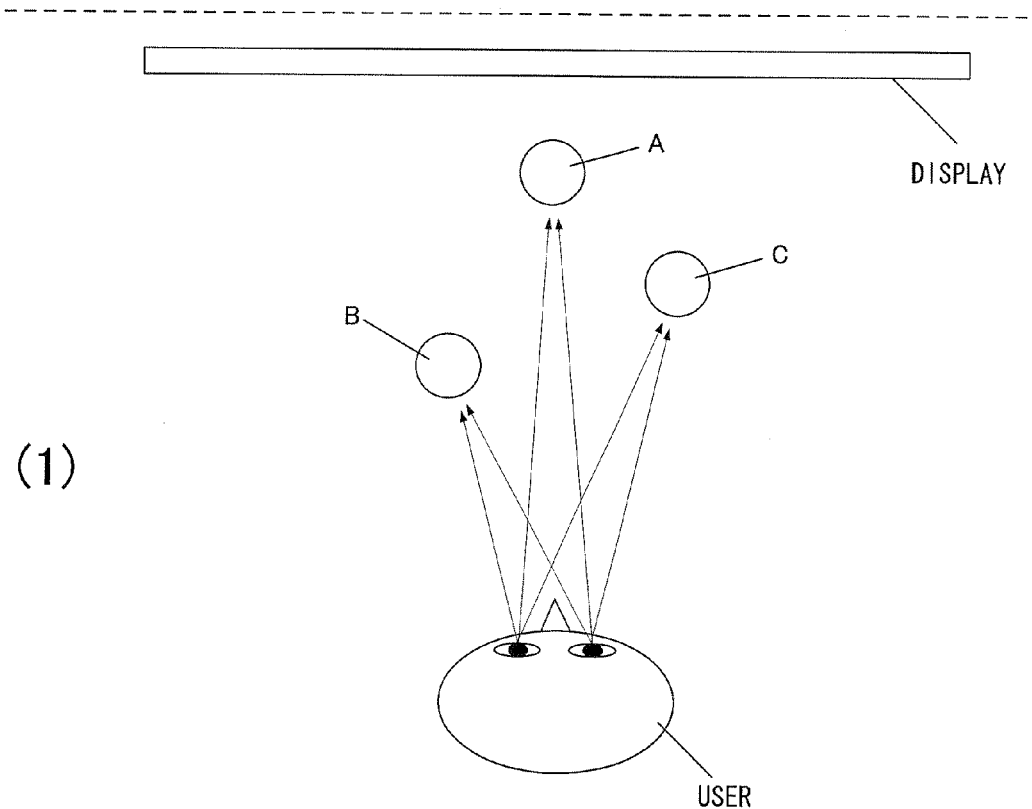
(1)
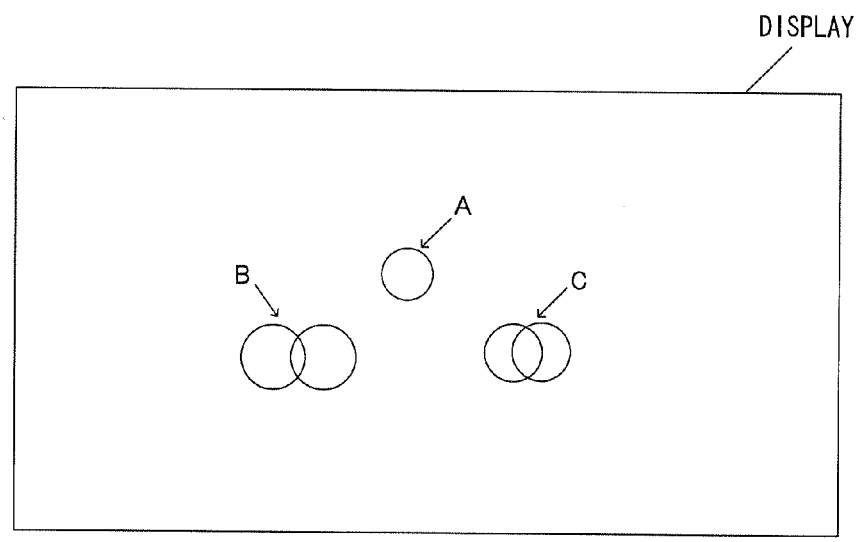
(2)

F I G. 2 1
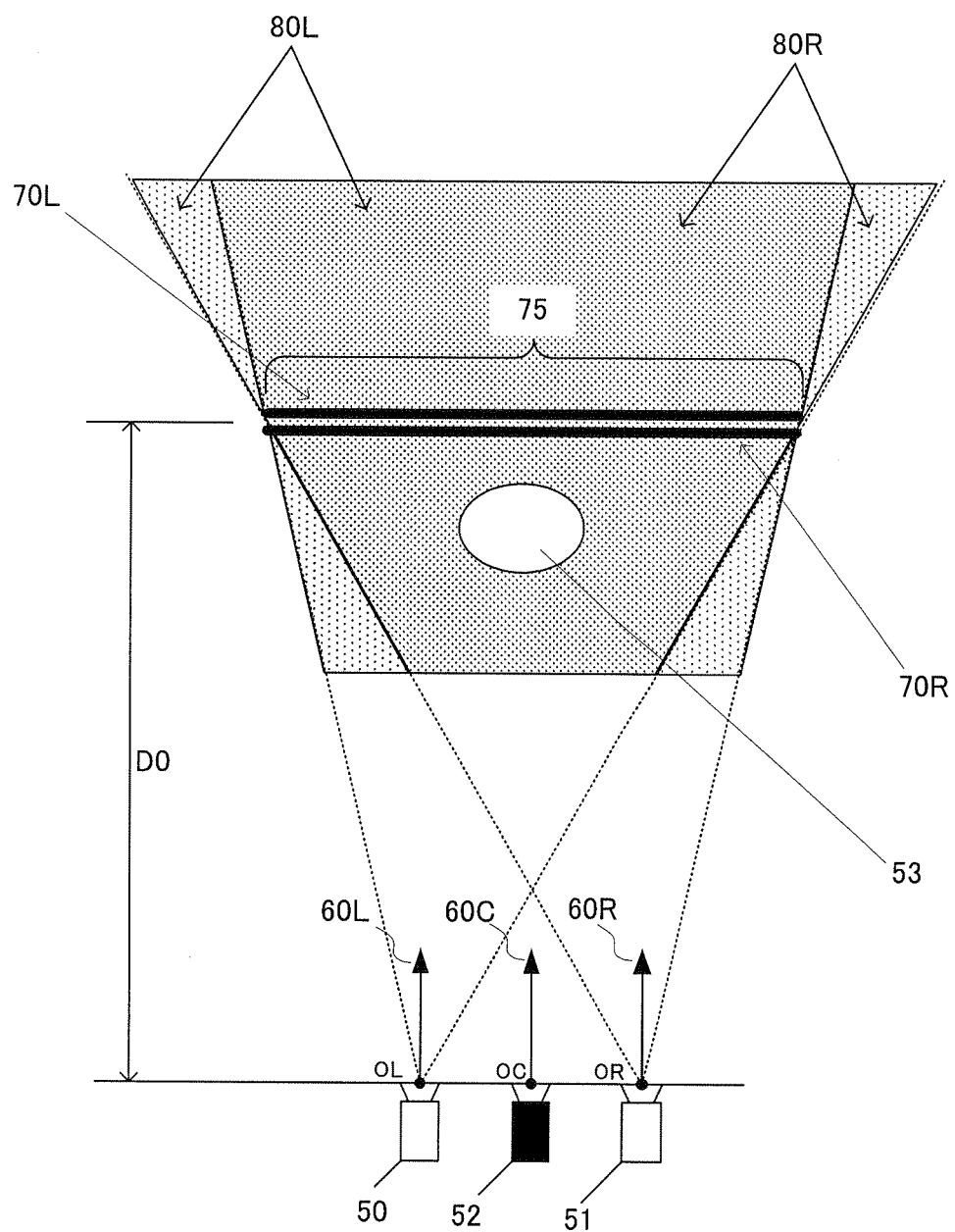

IMAGE PROCESSING SYSTEM, STORAGE MEDIUM, IMAGE PROCESSING METHOD, AND IMAGE PROCESSING APPARATUS FOR CORRECTING THE DEGREE OF DISPARITY OF DISPLAYED OBJECTS

CROSS REFERENCE TO RELATED APPLICATION

The disclosure of Japanese Patent Application No. 2010-294469, filed on Dec. 29, 2010, is incorporated herein by reference.

FIELD

The exemplary embodiments disclosed herein relate to an image processing system, a storage medium, an image processing method, and an image processing apparatus, and more particularly, relate to an image processing system, a storage medium, an image processing method, and an image processing apparatus which implement stereoscopic display.

BACKGROUND AND SUMMARY

As conventional art, there is a technology in which stereoscopic display is performed using an image for a left eye and an image for a right eye between which a disparity is provided. For example, a certain literature discloses a technology in which images of a virtual three-dimensional space are taken with virtual cameras to generate an image for a left eye and an image for a right eye, and the virtual three-dimensional space is stereoscopically displayed using these images.

According to the above conventional technology, when an object located in the virtual three-dimensional space is closer to the virtual cameras than a predetermined position, the object is displayed so as to be viewed as if projecting from a display surface toward the viewer. When the object is farther from the virtual cameras than the predetermined position, the object is displayed so as to be viewed as if being recessed from the display surface. With regard to an object close to the virtual cameras, it may be difficult to view the object due to a great disparity between an image for a left eye and an image for a right eye.

Therefore, a feature of certain exemplary embodiments is to provide an image processing system and the like which implement stereoscopic display that is easily viewed.

Certain exemplary embodiments can have, for example, the following aspects to attain the feature mentioned above.

An aspect of certain exemplary embodiments is directed to an image processing system for generating a stereoscopic image that is stereoscopically visible. The image processing system includes stereoscopic image generator and display controller. The stereoscopic image generator is configured to take images of a virtual three-dimensional space in which an object is located, with a virtual camera, and to generate a stereoscopic image that is composed of an image for a left eye and an image for a right eye between which a disparity is provided. The display controller is configured to cause a display section to display the stereoscopic image generated by the stereoscopic image generator. In generating the stereoscopic image, the stereoscopic image generator performing correction of decreasing a disparity of the object.

According to this configuration, correction for alleviating the degree of projection of a viewed object that is stereoscopically displayed on the display section can be performed. Thus, stereoscopic display that is easily viewed by a user can be implemented.

Further, in generating the stereoscopic image, the stereoscopic image generator may perform correction of decreasing a disparity of an object in accordance with a distance from the virtual camera to the object.

According to this configuration, the degree of projection of the object can be alleviated in accordance with a distance from the virtual camera to the object.

Further, in generating the stereoscopic image, the stereoscopic image generator may perform correction of more greatly decreasing the disparity of the object when the distance from the virtual camera to the object is shorter.

According to this configuration, for objects stereoscopically displayed on the display section, the degree of projection of an object that greatly projects to such an extent that it is difficult for a user to view the object can greatly be alleviated.

Further, in generating the stereoscopic image, the stereoscopic image generator may perform the correction such that a disparity of an object closer to the virtual camera is larger.

According to this configuration, when the degree of projection of a plurality of objects is alleviated, the positional relation among each object in the depth direction can be maintained normal. In addition, when one object is displayed so as to project toward the user, the object is not viewed so as to instantaneously and slightly return, and a manner of movement of the object becomes natural.

Further, in generating the stereoscopic image, the stereoscopic image generator may perform correction of moving a position of the object in the image for a left eye in a leftward direction as seen from a user, and/or may perform correction of moving a position of the object in the image for a right eye in a rightward direction as seen from the user, thereby performing correction of decreasing the disparity of the object.

According to this configuration, correction for alleviating the degree of projection of a viewed object that is stereoscopically displayed on the display section can be performed.

Further, in generating the stereoscopic image, by using a left virtual camera for taking the image for a left eye, a right virtual camera for taking the image for a right eye, and an intermediate virtual camera located between the left virtual camera and the right virtual camera, the stereoscopic image generator may perform correction of adjusting a position of an object in the image for a left eye such that the position is located between a position based on the left virtual camera and a position based on the intermediate virtual camera, and/or may perform correction of adjusting a position of the object in the image for a right eye such that the position is located between a position based on the right virtual camera and the position based on the intermediate virtual camera, thereby performing correction of decreasing the disparity of the object.

According to this configuration, correction for alleviating the degree of projection of a viewed object can be implemented by performing the correction process using the intermediate virtual camera.

Further, in generating the stereoscopic image, the stereoscopic image generator may perform correction of adjusting the position of the object in the image for a left eye such that the position is an interpolation position obtained by interpolating the position based on the left virtual camera and the position based on the intermediate virtual camera in accordance with distances from both virtual cameras to the object, and/or may perform correction of adjusting the position of the object in the image for a right eye such that the position is an interpolation position obtained by interpolating the position based on the right virtual camera and the position based on the intermediate virtual camera in accordance with distances from both virtual cameras to the object, thereby performing correction of decreasing the disparity of the object.

According to this configuration, correction for alleviating the degree of projection of a viewed object in accordance with a distance from the virtual camera to the object can be implemented by performing the correction process using the intermediate virtual camera.

Further, in generating the stereoscopic image, the stereoscopic image generator may render the object with the virtual camera after a relative position of the object with respect to the virtual camera is corrected, thereby performing correction of decreasing the disparity of the object.

According to this configuration, correction for alleviating the degree of projection of a viewed object can be performed by correcting a relative position of the object with respect to the virtual camera.

Further, in generating the stereoscopic image, the stereoscopic image generator may render the object with the virtual camera after a position of the object in a view coordinate system of the virtual camera is corrected, thereby performing correction of decreasing the disparity of the object.

According to this configuration, in the process of rendering the object with the virtual camera, the position of the object in the view coordinate system is corrected after coordinate transformation is performed from a world coordinate system into the view coordinate system of the virtual camera. Thus, correction for alleviating the degree of projection of a viewed object located in a world space can be implemented without moving the position of the object (or its vertex).

Further, in generating the stereoscopic image, the stereoscopic image generator may render the object with the virtual camera after the relative position of the object with respect to the virtual camera is corrected only in a right-left direction as seen from the virtual camera, thereby performing correction of decreasing the disparity of the object.

According to this configuration, a process of moving the relative position of the object with respect to the virtual camera in the depth direction and the up-down direction as seen from the virtual camera, does not have to be performed. Thus, a processing load for performing the correction of decreasing the disparity of the object can be reduced.

Further, in generating the stereoscopic image, the stereoscopic image generator may render the object with a left virtual camera and a right virtual camera after at least either one of a relative position of the object with respect to the left virtual camera or a relative position of the object with respect to the right virtual camera is corrected, thereby performing correction of decreasing the disparity of the object.

According to this configuration, the disparity of the object can be decreased by correcting at least either one of the relative position of the object with respect to the left virtual camera or the relative position of the object with respect to the right virtual camera. Thus, a processing load for performing the correction of decreasing the disparity of the object can be reduced.

Further, a direction of correction of the relative position of the object with respect to the left virtual camera may be different from a direction of correction of the relative position of the object with respect to the right virtual camera.

According to this configuration, correction for alleviating the degree of projection of a viewed object that is stereoscopically displayed on the display section can be performed.

Further, in generating the stereoscopic image, the stereoscopic image generator may temporarily correct the relative position of the object with respect to the virtual camera for rendering the object with the virtual camera, and may perform correction of decreasing the disparity of the object.

According to this configuration, correction for alleviating the degree of projection of a viewed object located in a world space can be implemented without moving the position of the object (or its vertex).

Further, in generating the stereoscopic image, by using a left virtual camera for taking the image for a left eye, a right virtual camera for taking the image for a right eye, and an intermediate virtual camera located between the left virtual camera and the right virtual camera, when generating the image for a left eye, the stereoscopic image generator may interpolate a relative position of an object with respect to the left virtual camera and a relative position of the object with respect to the intermediate virtual camera in accordance with distances from both virtual cameras to the object to calculate an interpolation position, and may render the object with the left virtual camera using the interpolation position, and/or when generating the image for a right eye, the stereoscopic image generator may interpolate a relative position of the object with respect to the right virtual camera and the relative position of the object with respect to the intermediate virtual camera in accordance with distances from both virtual cameras to the object to calculate an interpolation position, and may render the object with the right virtual camera using the interpolation position, thereby performing correction of decreasing the disparity of the object.

According to this configuration, by performing the interpolation, the disparity between the object in the image for a left eye and the object in the image for a right eye can be corrected so as to be decreased. In addition, in the interpolation, the interpolation position is calculated in accordance with the distance from the virtual camera to the object in the virtual three-dimensional space, thereby setting a decrease amount of the disparity in accordance with the distance to the object.

Further, when generating the image for a left eye, the stereoscopic image generator may interpolate a relative coordinate of each vertex of an object with respect to the left virtual camera and a relative coordinate of each vertex of the object with respect to the intermediate virtual camera in accordance with distances from both virtual cameras to each vertex to calculate an interpolation coordinate, and may render each vertex with the left virtual camera using the interpolation coordinate, and/or when generating the image for a right eye, the stereoscopic image generator may interpolate a relative coordinate of each vertex of the object with respect to the right virtual camera and the relative coordinate of each vertex of the object with respect to the intermediate virtual camera in accordance with distances from both virtual cameras to each vertex to calculate an interpolation coordinate, and may render each vertex with the right virtual camera using the interpolation coordinate, thereby performing correction of decreasing a disparity of each vertex of the object.

According to this configuration, correction for alleviating a disparity is performed on each vertex constituting an object. Thus, for example, even when a large object (an object having a large depth) is displayed so as to greatly project, natural correction can be performed.

Further, in generating the stereoscopic image, the stereoscopic image generator may perform correction of decreasing a disparity of each vertex constituting an object, in accordance with a distance from the virtual camera to each vertex.

According to this configuration, correction for alleviating a disparity is performed on each vertex constituting an object. Thus, for example, even when a large object (an object having a large depth) is displayed so as to greatly project, natural correction can be performed.

Further, in generating the stereoscopic image, the stereoscopic image generator may not decrease a disparity of an object any more when a distance from the virtual camera to the object is shorter than a predetermined distance.

According to this configuration, since the predetermined distance is provided, a correction amount (decrease amount) of the disparity can be prevented from being very large. Thus, when the degree of projection of a plurality of objects is alleviated, the positional relation among each object in the depth direction can be maintained normal.

Further, in generating the stereoscopic image, the stereoscopic image generator may not perform correction of decreasing a disparity of an object when a distance from the virtual camera to the object is longer than a predetermined distance.

According to this configuration, the correction is not performed on an object located at a position (depth) where the correction does not have to be performed. Thus, a load of image processing can be reduced.

Further, in generating the stereoscopic image, the stereoscopic image generator may perform the correction only on an object that is a correction target.

According to this configuration, it can be set whether or not to perform the correction on each object. Thus, the correction can be prevented from being performed on an object for which the correction is unnecessary (the necessity of the correction is low) (e.g., a hardly-noticeable object). As a result, a load of image processing can be reduced.

In the above description, certain exemplary embodiments are configured as an image processing system. However, certain exemplary embodiments may be configured as an image processing program, an image processing method, or an image processing apparatus. In addition, certain exemplary embodiments may be configured as a computer-readable storage medium having the image processing program stored therein.

According to certain exemplary embodiments, an image processing system and the like which implement stereoscopic display that is easily viewed can be provided.

These and other objects, features, aspects and advantages of certain exemplary embodiments will become more apparent from the following detailed description of certain exemplary embodiments when taken in conjunction with the accompanying drawings.

BRIEF DESCRIPTION OF THE DRAWINGS

FIG. 4 is a diagram illustrating an outline of a non-limiting example of a characteristic operation in an exemplary embodiment;

FIG. 21 is a diagram illustrating a non-limiting example of imaging ranges of the left virtual camera 50 and the right virtual camera 51.

DETAILED DESCRIPTION OF NON-LIMITING EXAMPLE EMBODIMENTS (Exemplary Embodiment)

Hereinafter, a game apparatus that is an image processing apparatus according to an exemplary embodiment will be described. It should be noted that the exemplary embodiments disclosed herein are not limited to such an apparatus, may be an image processing system that implements the functions of such an apparatus, may be an image processing method in such an apparatus, and may be an image processing program executed on such an apparatus. Further, the exemplary embodiments disclosed herein may be a computer-readable storage medium having the image processing program stored therein.

(External Structure of Game Apparatus)

Figure 1:
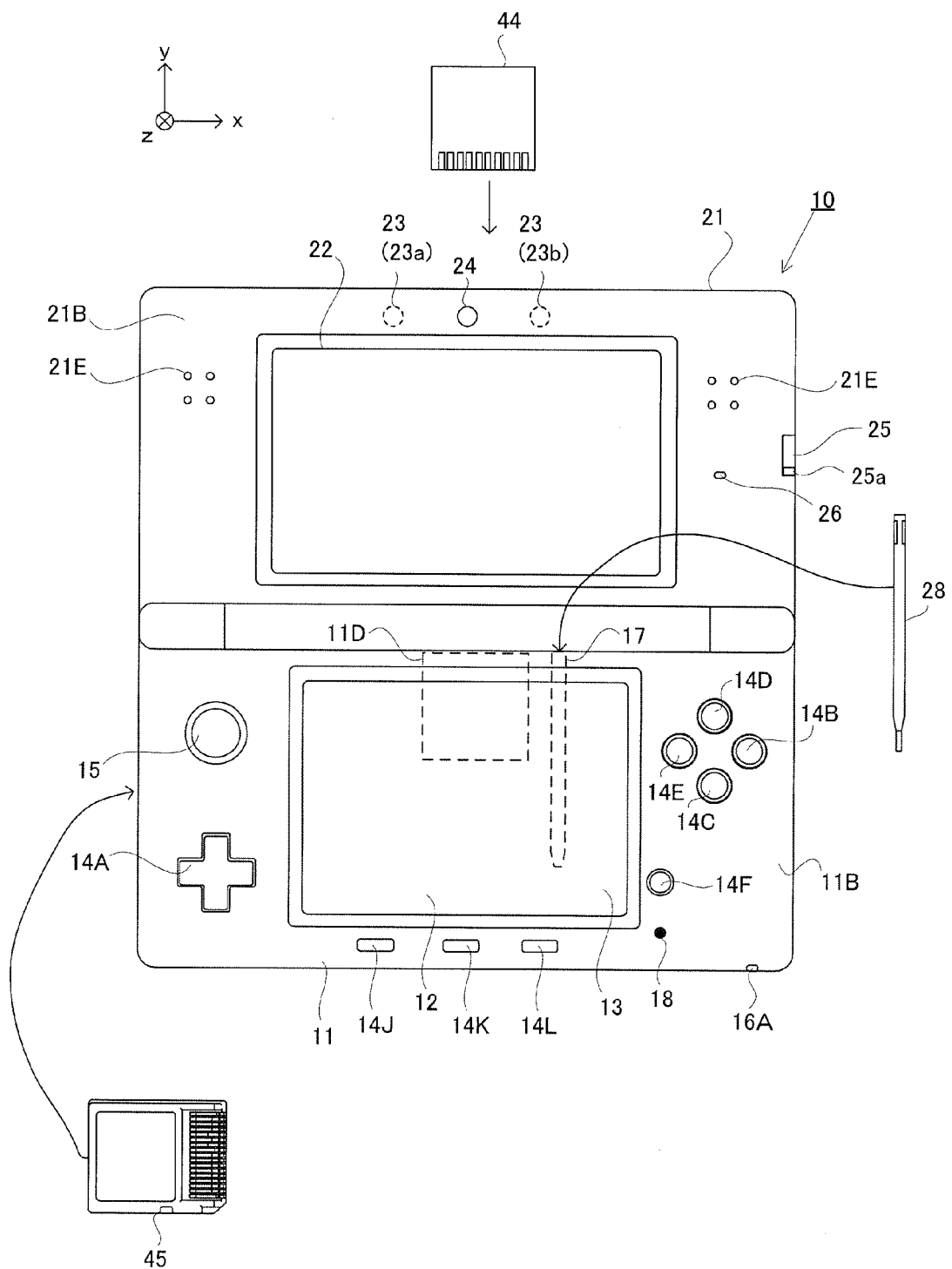
FIG. 1 is a front view of a non-limiting example of a game apparatus 10 in an opened state.
Figure 2:
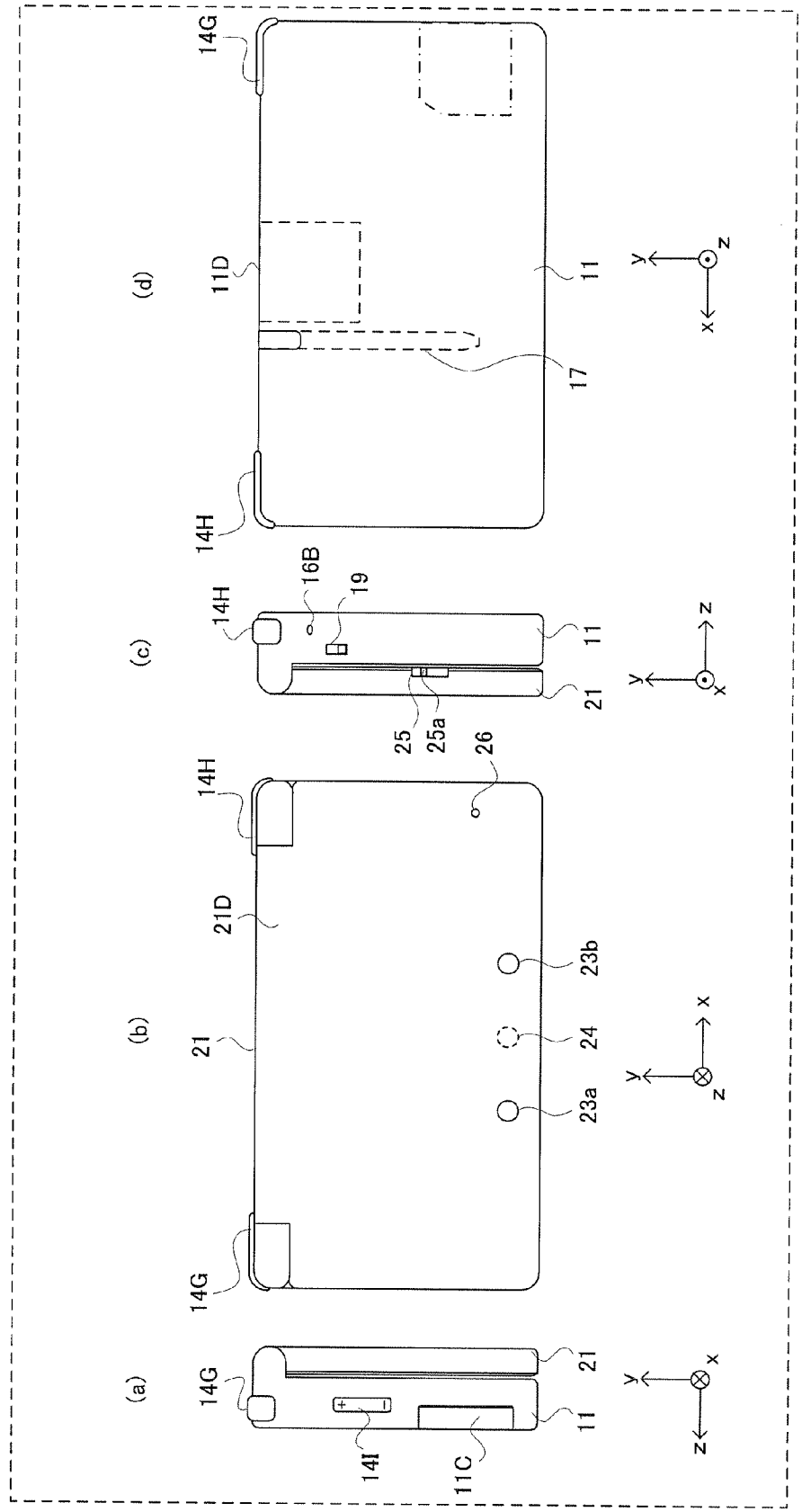
FIG. 2 is a left side view, a front view, a right side view, and a rear view of a non-limiting example of the game apparatus 10 in a closed state.

Hereinafter, the game apparatus according to the exemplary embodiment will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the exemplary embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the exemplary embodiment, the touch panel 13 may be, but is not limited to, a resistive film type touch panel. A touch panel of any type such as electrostatic capacitance type may be used. In the exemplary embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a virtual three-dimensional space is executed by the game apparatus 10, the analog stick 15 acts as an input device for moving the predetermined object in the virtual three-dimensional space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(b) and 2(d), an L button 14G and an R button 14H are provided on the upper side surface of the lower housing 11 The L button 14G and the R button 14H can act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the exemplary embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image (stereoscopic image). Further, in the exemplary embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are displayed alternately in a time division manner may be used. Further, in the exemplary embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the exemplary embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. In addition, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be configured to be lit up only when the upper LCD 22 is in the stereoscopic display mode and program processing for displaying a stereoscopic image is performed.

Further, a speaker hole 21E is provided on the inner side surface of the upper housing 21. A sound is outputted through the speaker hole 21E from a speaker 43 described below.

(Internal Configuration of Game Apparatus 10)

Figure 3:
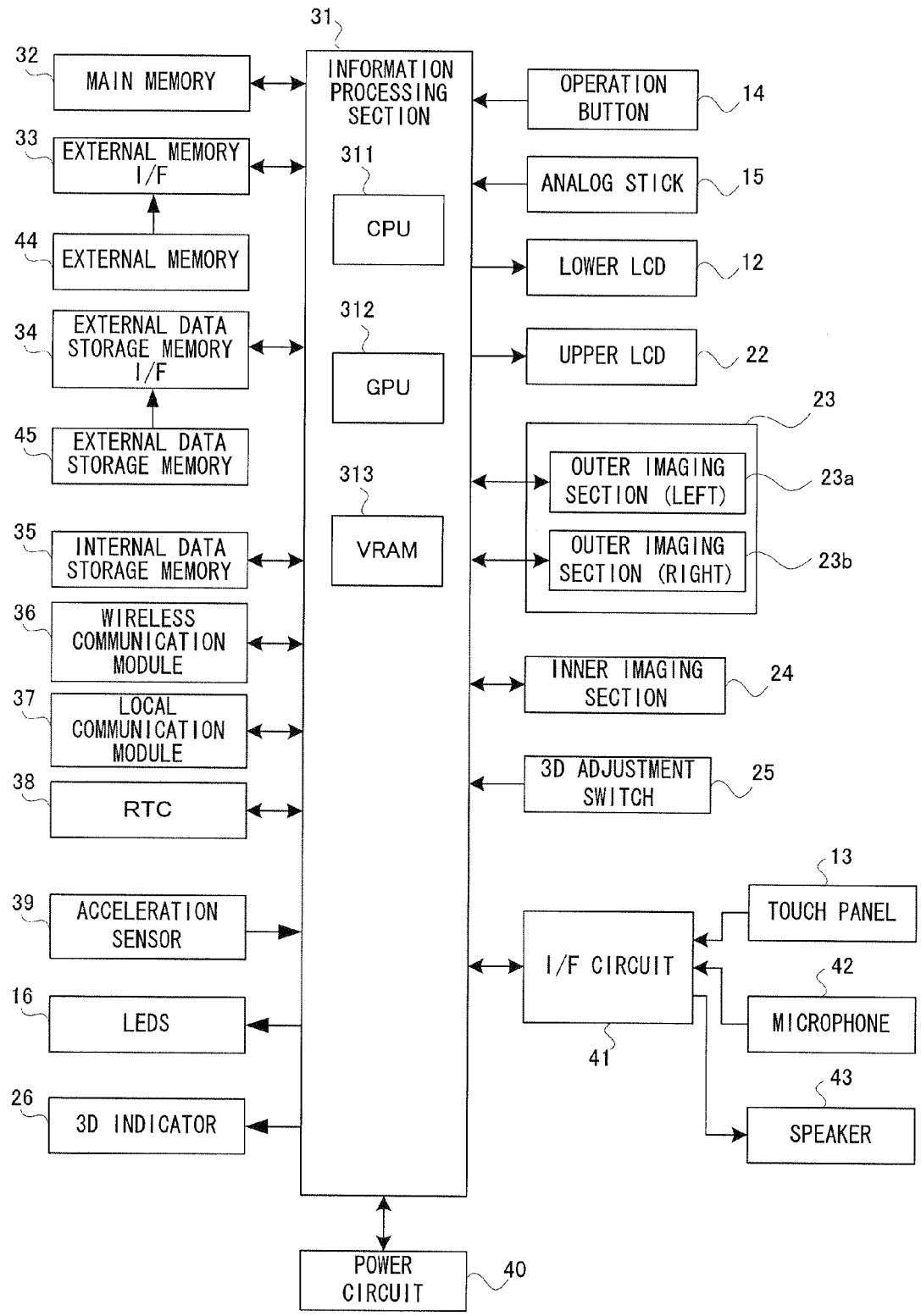
FIG. 3 is a block diagram illustrating a non-limiting example of an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby performing processing corresponding to the program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program acquired from the outside (the external memory 44, another device, or the like), for example. In the exemplary embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol and infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10. In addition to (or instead of) the acceleration sensor 39, another sensor such as an angle sensor or an angular velocity sensor may be connected to the information processing section 31, and an orientation and a motion of the game apparatus 10 may be detected by this sensor.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The LED 16 (16A and 16B) is connected to the information processing section 31. The information processing section 31 uses the LED 16 to notify the user of the ON/OFF state of the power supply of the game apparatus 10, or to notify the user of the establishment state of the wireless communication of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The analog stick 15 is connected to the information processing section 31. From the analog stick 15, operation data indicating an analogue input (an operation direction and an operation amount) on the analog stick 15 is outputted to the information processing section 31. The information processing section 31 obtains the operation data from the analog stick 15 to perform processing corresponding to the input on the analog stick 15.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 causes the lower LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

(Outline of Characteristic Operation in Exemplary Embodiment)

Figure 5:
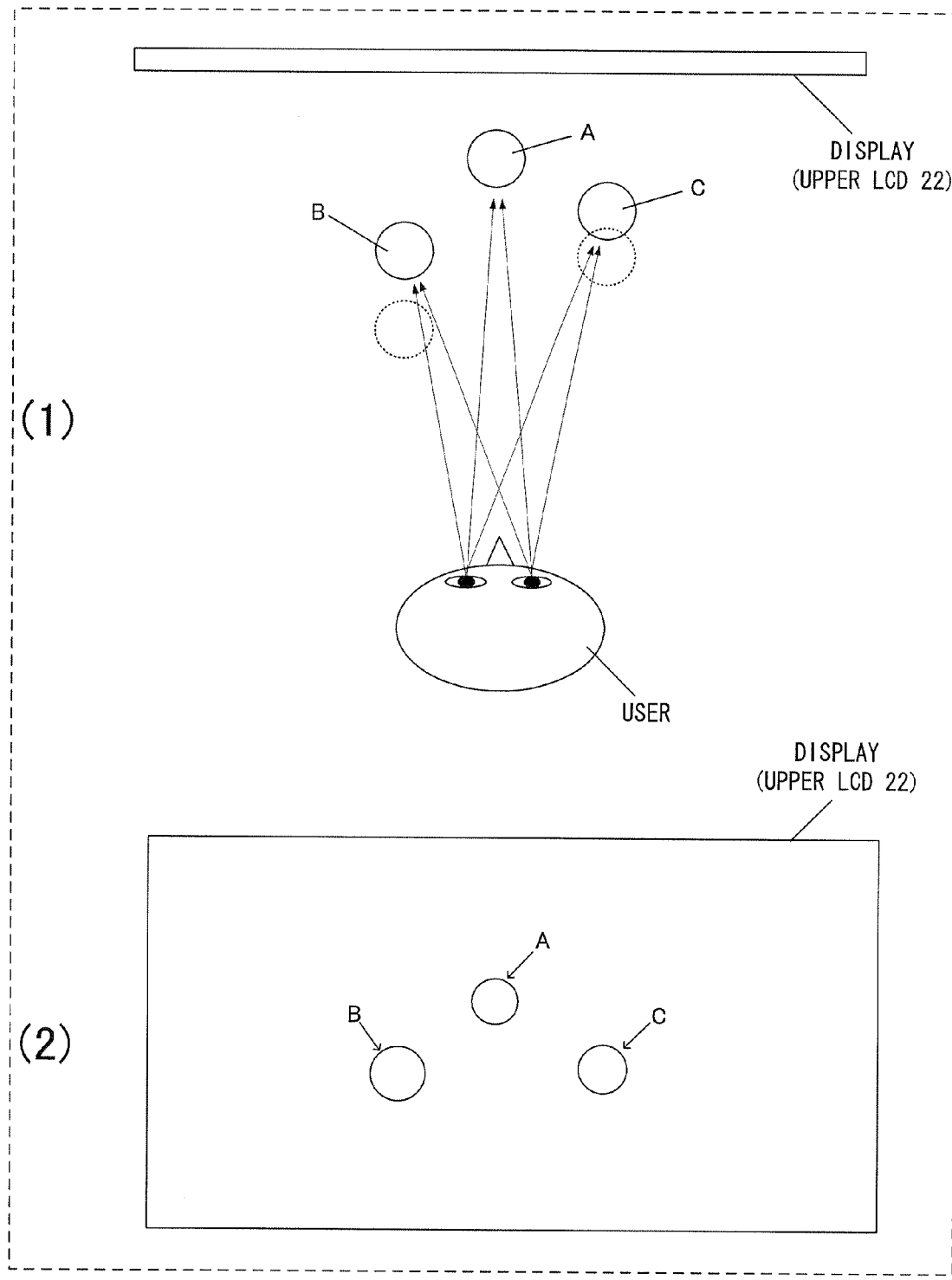
FIG. 5 is a diagram illustrating an outline of a non-limiting example of the characteristic operation in the exemplary embodiment.

Next, with reference to FIGS. 4 and 5, an outline of a characteristic operation in the exemplary embodiment will be described. FIGS. 4 and 5 are diagrams illustrating examples of the case where an object is viewed so as to project toward the user through stereoscopic display. In FIGS. 4 and 5, the part (1) is a conceptual diagram illustrating a situation where the user views a display for performing stereoscopic display, as seen from above, and the part (2) is a diagram illustrating the display, in the situation (1), which is viewed by the user.

As shown in FIG. 4(1), objects A, B, and C are stereoscopically displayed on the display so as to project from the screen toward the user. Specifically, on the display, the object A is displayed with such a disparity that the object A is viewed at a position close to the user, the object C is displayed with such a disparity that the object C is viewed at a position closer to the user than the object A, and the object B is displayed with such a disparity that the object B is viewed at a position closer to the user than the object C. Here, when an object is displayed with such a disparity that the object is viewed so as to greatly project toward the user (i.e., with a great disparity), it may be difficult for the user to view the object. Specifically, the user may view each of the object C projecting greatly and the object B projecting further greatly, as two blurred images as shown in FIG. 4(2).

Therefore, in the exemplary embodiment, the degree of projection of an object that is stereoscopically displayed on the upper LCD 22 so as to project toward the user beyond a predetermined position, is alleviated. Specifically, as shown in FIG. 5(1), correction for alleviating the degree of projection (namely, the disparity) of each of the objects C and B shown in FIG. 4(1) is performed. In FIG. 5(1), the positions before correction of the objects are indicated by dotted lines. By so doing, in the exemplary embodiment, the objects A, B, and C are stereoscopically and easily visible by the user as shown in FIG. 5(2). In addition, in the exemplary embodiment, as seen from FIG. 5(2), the correction is performed without changing the positional relation among each object in the depth direction between before and after the correction. Moreover, in the exemplary embodiment, a process for alleviating a disparity is performed on each vertex forming an object, to perform the above correction. Due to this, for example, even when a large object (an object having a large depth) is displayed so as to greatly project, natural correction can be performed.

(Details of Image Processing)

Figure 6:
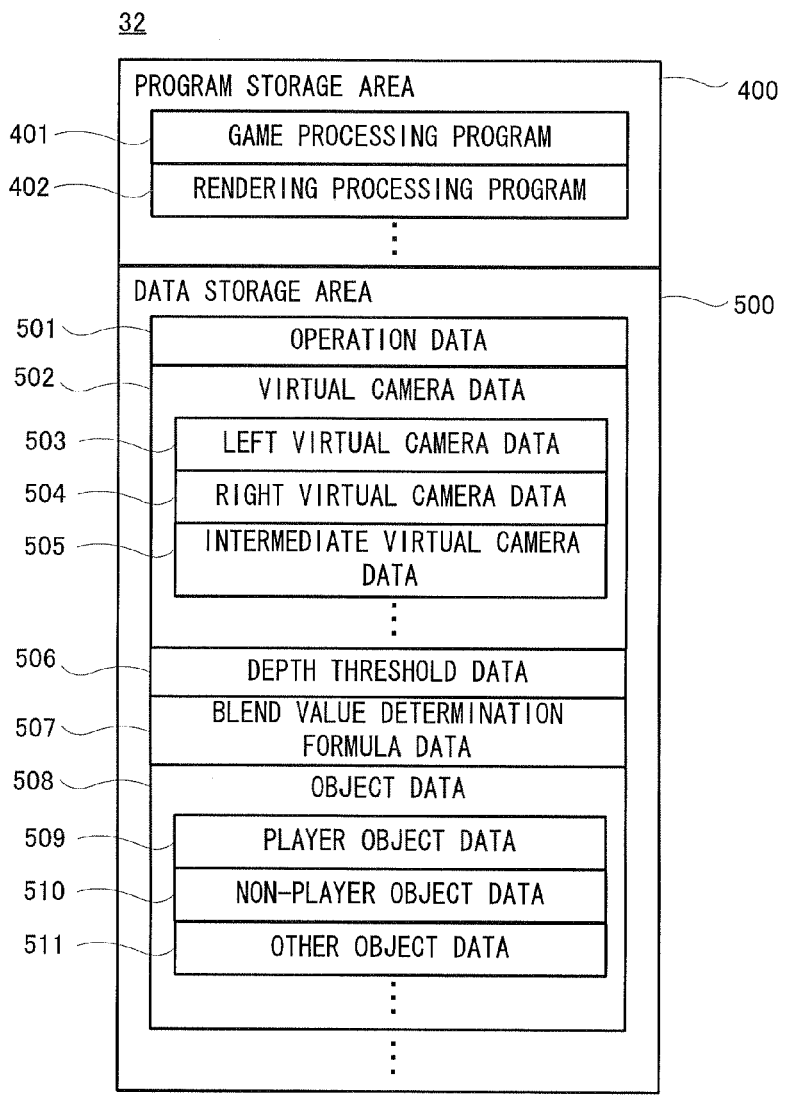
FIG. 6 is a diagram illustrating a non-limiting example of a memory map of a main memory 32 of the game apparatus 10.

Next, image processing performed when game processing is performed by the game apparatus 10 will be described in detail. First, data stored in the main memory 32 during the game processing will be described. FIG. 6 is a diagram illustrating an example of a memory map of the main memory 32 of the game apparatus 10. As shown in FIG. 6, the main memory 32 includes a program storage area 400 and a data storage area 500. A part of data in the program storage area 400 and the data storage area 500 is stored, for example, in the external memory 44, and is read out and stored in the main memory 32 when the game processing is performed.

In the program storage area 400, programs, such as a game processing program 401 that performs processing in a flowchart shown in FIG. 8 described below, a rendering processing program 402 that performs processing in a flowchart shown in FIG. 9 described below, are stored.

In the data storage area 500, operation data 501, virtual camera data 502, depth threshold data 506, blend value determination formula data 507, object data 508, and the like are stored.

The operation data 501 indicates an operation performed by the user on each of the operation buttons 14A to 14E and 14G to 14H, the analog stick 15, and the touch panel 13. The operation data 501 indicates, for example, an operation performed by the user for moving a player object.

The virtual camera data 502 includes left virtual camera data 503, right virtual camera data 504, and intermediate virtual camera data 505.

The left virtual camera data 503 is data regarding a left virtual camera 50 for taking (rendering) an image for a left eye that is to be shown to the left eye of the user, and indicates a position, an imaging direction, an imaging view angle, and the like of the left virtual camera 50 in a virtual three-dimensional space in which a game is progressed.

The right virtual camera data 504 is data regarding a right virtual camera 51 for taking (rendering) an image for a right eye that is to be shown to the right eye of the user, and indicates a position, an imaging direction, an imaging view angle, and the like of the right virtual camera 51 in the virtual three-dimensional space in which the game is progressed.

The intermediate virtual camera data 505 is data regarding an intermediate virtual camera 52 used for performing correction of a disparity as described above with reference to FIGS. 4 and 5, and indicates a position, an imaging direction, and the like of the intermediate virtual camera 52 in the virtual three-dimensional space in which the game is progressed.

Figure 10:
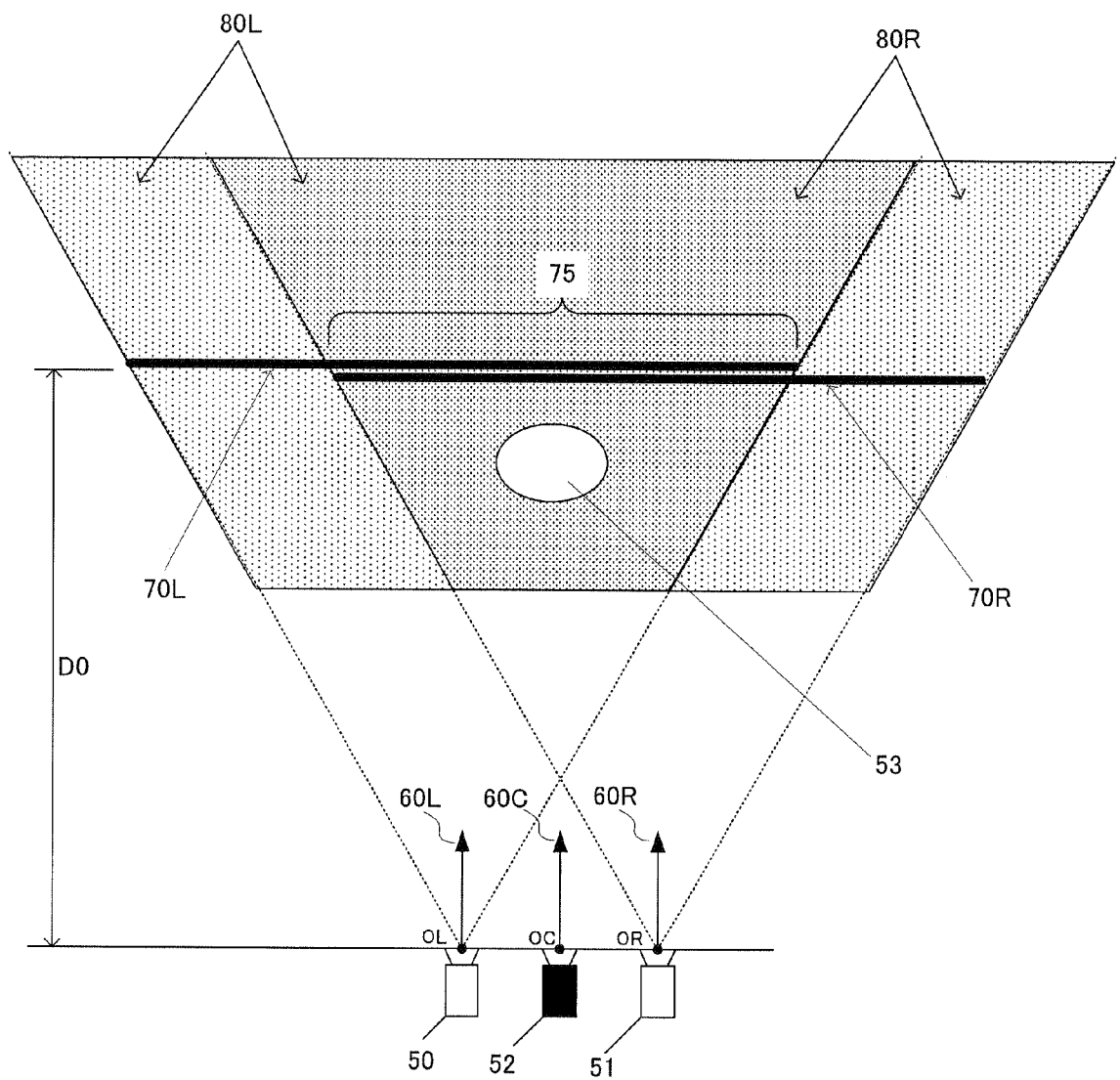
FIG. 10 is a diagram illustrating a non-limiting example of a positional relation among and imaging ranges of a left virtual camera 50, a right virtual camera 51, and an intermediate virtual camera 52.

The positional relation among the left virtual camera 50, the right virtual camera 51, and the intermediate virtual camera 52 will be described below with reference to FIG. 10. In addition, with regard to these three virtual cameras, it may be considered that a single virtual camera serves as three virtual cameras by changing its position and the like and taking (rendering) an image.

The depth threshold data 506 indicates a depth threshold DT that is set to a z coordinate value (may be considered as a depth from the intermediate virtual camera 52) in a view coordinate system of the intermediate virtual camera 52. In the exemplary embodiment, as an example, the depth threshold DT=10.0. The depth threshold DT will be described in detail below with reference to FIG. 12.

Figure 7:
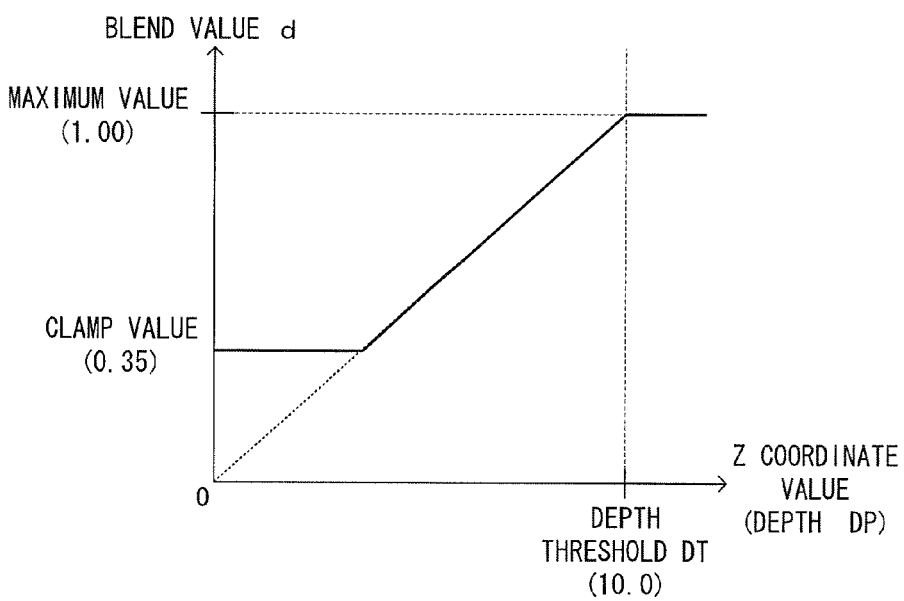
FIG. 7 is a graph representing a non-limiting example of a blend value determination formula.

The blend value determination formula data 507 indicates a mathematical formula (blend value determination formula) that defines a relation between a blend value d used for performing correction of a disparity as described above with reference to FIGS. 4 and 5 and a z coordinate value in the view coordinate system (a view space) of the intermediate virtual camera 52. FIG. 7 is a graph representing an example of the blend value determination formula. As shown in FIG. 7, when the z coordinate value is equal to or higher than the depth threshold DT (10.0), the blend value d is its maximum value (1.00). When the z coordinate value decreases from the depth threshold DT, the blend value d linearly decreases. When the blend value d reaches a clamp value (0.35), the blend value d does not decrease any more (is fixed) regardless of a decrease in the z coordinate value. The reason why the clamp value is provided is to prevent the positional relation among each object in the depth direction from being changed due to the correction for alleviating the degree of projection (the magnitude of the disparity) of each viewed object. The blend value determination formula may be replaced with a table that defines the relation shown in FIG. 7.

The object data 508 includes player object data 509, non-player object data 510, and other object data 511.

The player object data 509 indicates a position, an orientation, a shape (polygon shape), a color (texture), and the like of a player object in the virtual three-dimensional space.

The non-player object data 510 indicates positions, orientations, shapes (polygon shapes), colors (textures), and the like of non-player objects in the virtual three-dimensional space. The non-player objects are, for example, enemy objects and tool objects.

The other object data 511 indicates positions, orientations, shapes (polygon shapes), colors (textures), and the like of other objects in the virtual three-dimensional space. The other objects are, for example, building objects and background objects.

Next, a flow of the game processing performed by the game apparatus 10 will be briefly described with reference to FIG. 8. When the game apparatus 10 is powered on, the CPU 311 of the game apparatus 10 executes a boot program stored in the internal data storage memory 35 or the like, thereby initializing each unit such as the main memory 32. Then, the game processing program 401 and the like stored in the external memory 44 are loaded into the main memory 32, and the game processing program 401 is executed by the CPU 311.

Figure 8:
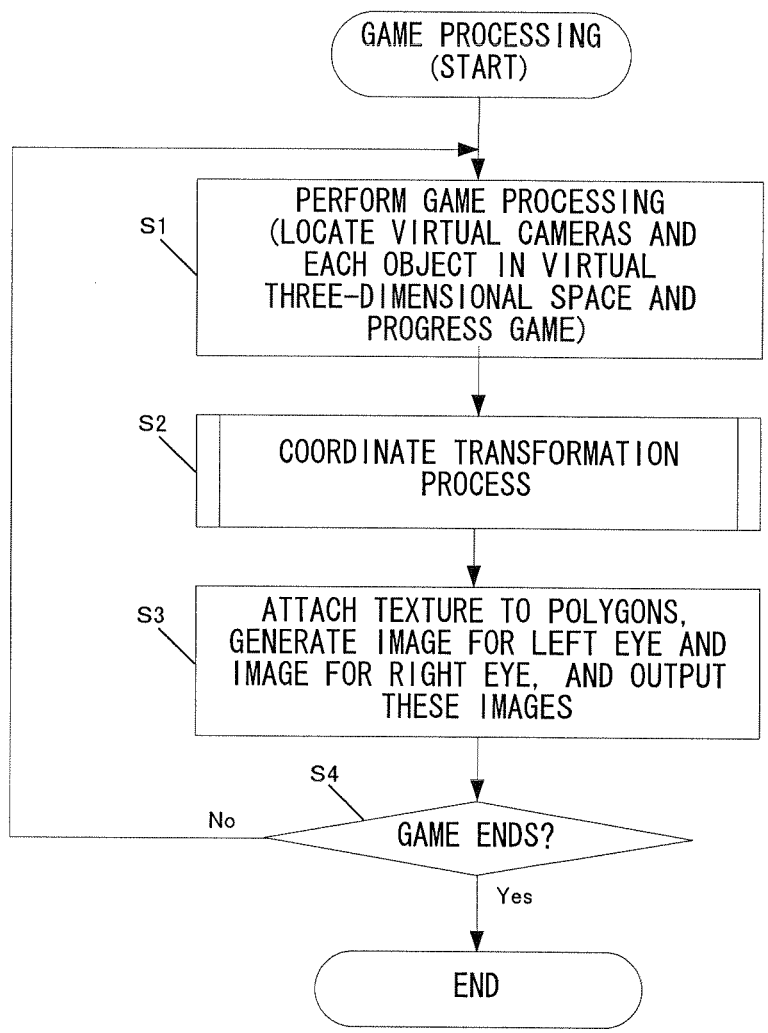
FIG. 8 is an example of a flowchart of game processing performed by a CPU 311.
Figure 9:
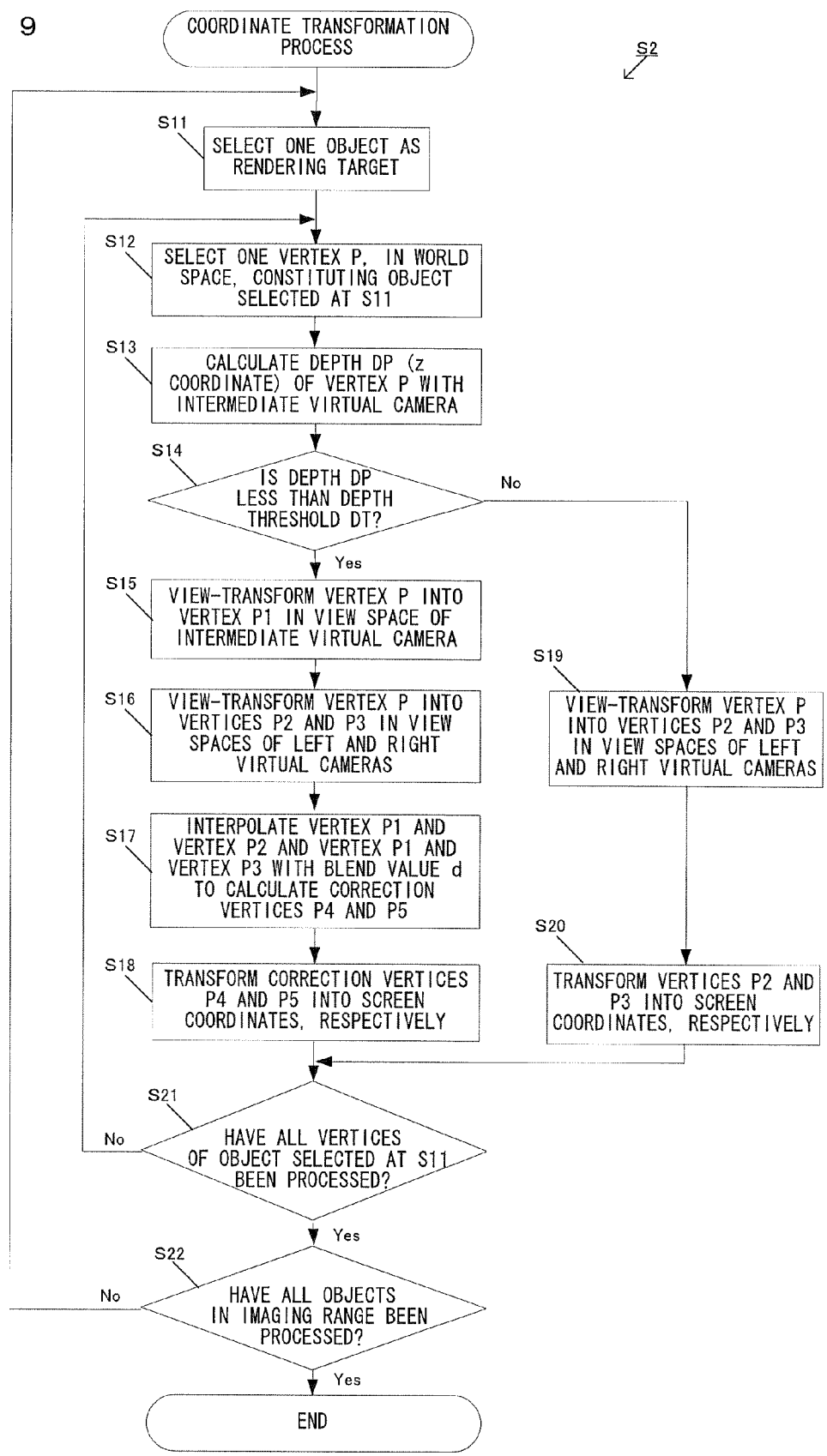
FIG. 9 is a non-limiting example of a flowchart of a coordinate transformation process at step S2 in FIG. 8.

FIG. 8 is an example of a flowchart of the game processing performed by the CPU 311. The processing shown in the flowchart of FIG. 8 is repeatedly performed in every single frame (e.g., 1/60 sec). In the following, a description of processes that do not directly relate to the exemplary embodiments disclosed herein is omitted.

First, at step S1, the CPU 311 performs the game processing to progress a game. Specifically, the CPU 311 locates the player object, non-player objects, other objects, and the like in the virtual three-dimensional space in accordance with the object data 508, locates the left virtual camera 50, the right virtual camera 51, and the intermediate virtual camera 52 in the virtual three-dimensional space in accordance with the virtual camera data 502, and controls the player object in accordance with the operation data 501, to progress the game. Here, as shown in FIG. 10, the left virtual camera 50 and the right virtual camera 51 are arranged along a direction perpendicular to the imaging direction of the intermediate virtual camera 52 indicated by an arrow 60C, such that the intermediate virtual camera 52 is located at the midpoint between the left virtual camera 50 and the right virtual camera 51. The interval between the intermediate virtual camera 52 and the left virtual camera 50 is the same as the interval between the intermediate virtual camera 52 and the right virtual camera 51. In addition, the imaging directions 60L and 60R of the left virtual camera 50 and the right virtual camera 51 are the same as the imaging direction 60C of the intermediate virtual camera 52. Moreover, the position of the intermediate virtual camera 52 is indicated by a point OC, the position of the left virtual camera 50 is indicated by a point OL, and the position of the right virtual camera 51 is indicated by a point OR. Then, images of an object 53 that is an imaging target are taken (rendered) with the intermediate virtual camera 52, the left virtual camera 50, and the right virtual camera 51 (hereinafter, they may collectively be referred to as virtual camera). D0 is a depth at which the difference between the displayed position of an image for a left eye and the displayed position of an image for a right eye is zero, and an object present in a position at this depth is viewed on a display surface (the display surface of the upper LCD 22) (namely, the object is not viewed so as to project or be recessed). Here, a depth is a distance from the virtual camera in the imaging direction of the virtual camera, and specifically, a distance defined by a z coordinate value in the view coordinate system of the virtual camera (50, 51, or 52) in FIG. 13 or 14 described below. 80L indicates a region for which the left virtual camera 50 performs rendering, and 80R indicates a region for which the right virtual camera 51 performs rendering. When a screen (projection surface) is present in a position at the depth D0, a region 75 of an image 70L rendered by the left virtual camera 50 is cut out and displayed as an image for a left eye on the upper LCD 22, and a region 75 of an image 70R rendered by the right virtual camera 51 is cut out and displayed as an image for a right eye on the upper LCD 22. Further, in the process at step S1, in order to prevent a predetermined object from being a target for the process for alleviating a disparity as described above with reference to FIGS. 4 and 5 (processes at steps S15 to S18 described below with reference to FIG. 9), the CPU 311 controls the positional relation between the predetermined object and the virtual camera such that the predetermined object is spaced apart from the virtual camera by a predetermined distance (the depth threshold DT described below) or more. The predetermined object is, for example, the player object operated by the player or a background object. Then, the processing proceeds to step S2.

Here, processes at steps S2 and S3 are a process in which the GPU 312 executes the rendering processing program 402 to render, with the virtual camera, the virtual three-dimensional space (game space) in which the game is progressed by the process at step S1, and to display the virtual three-dimensional space on the upper LCD 22.

At step S2, the GPU 312 performs a coordinate transformation process. FIG. 9 is an example of a flowchart of the coordinate transformation process in rendering processing performed by the GPU 312. Hereinafter, the coordinate transformation process at step S2 will be described in detail with reference to FIG. 9.

First, at step S11, the GPU 312 selects, as a rendering target, one object on which the coordinate transformation process has not been performed. Then, the processing proceeds to step S12.

At step S12, the GPU 312 selects one vertex P (a vertex in a world space) that constitutes the object selected at step S11 and on which the coordinate transformation process has not been performed. Then, the processing proceeds to step S13.

Figure 11:
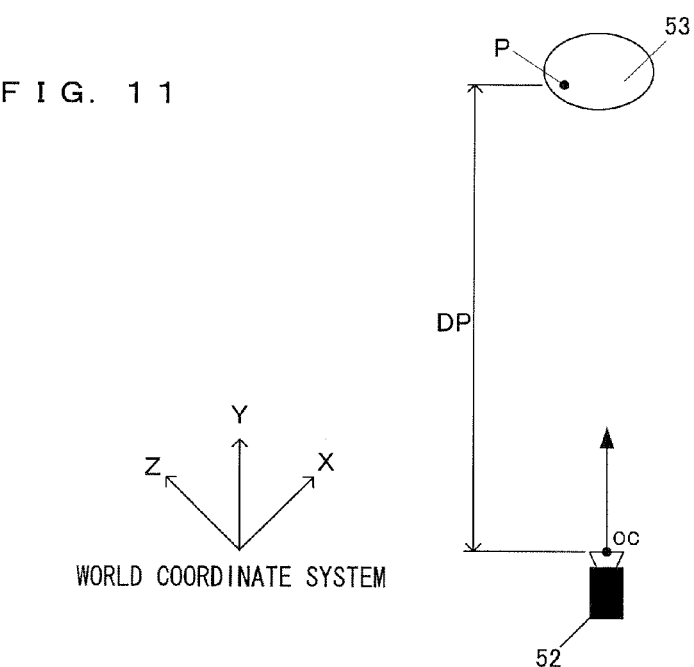
FIG. 11 is a diagram illustrating a non-limiting example of a process at step S13 in FIG. 9.

At step S13, as shown in FIG. 11, the GPU 312 calculates the depth DP of the vertex P selected at step S12, with the intermediate virtual camera 52. In other words, the GPU 312 calculates the z coordinate of the vertex P in the view space of the intermediate virtual camera 52. The view space may be referred to as viewing space or camera space, and a coordinate system that defines the view space is referred to as view coordinate system. Then, the processing proceeds to step S14.

Figure 12:
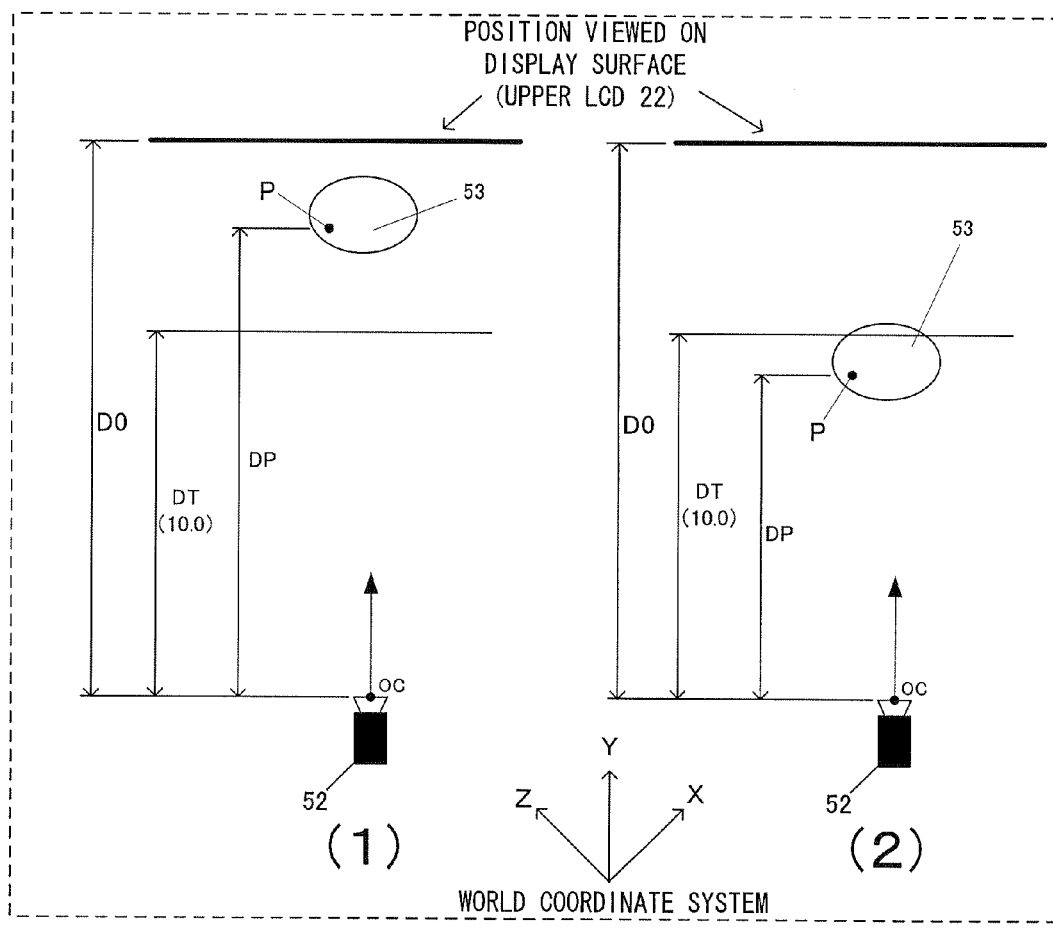
FIG. 12 is a diagram illustrating a non-limiting example of a process at step S14 in FIG. 9.

At step S14, the GPU 312 refers to the depth threshold data 506 and determines whether or not the depth DP calculated at step S13 is less than the depth threshold DT. Here, as shown in FIG. 12, the depth threshold DT is a value indicating the depth of a position closer to the intermediate virtual camera 52 by a predetermined distance than the position (D0) viewed on the display surface (the display surface of the upper LCD 22). Hereinafter, a description will be given where, as an example, the depth D0 of the position viewed on the display surface (the display surface of the upper LCD 22) is "15.0" and the depth threshold DT is "10.0". When a result of the determination at step S14 is YES (namely, in the case of the positional relation shown in FIG. 12(2)), the processing proceeds to step S15. When the result of the determination at step S14 is NO (namely, in the case of the positional relation shown in FIG. 12(1)), the processing proceeds to step S19.

Figure 13:
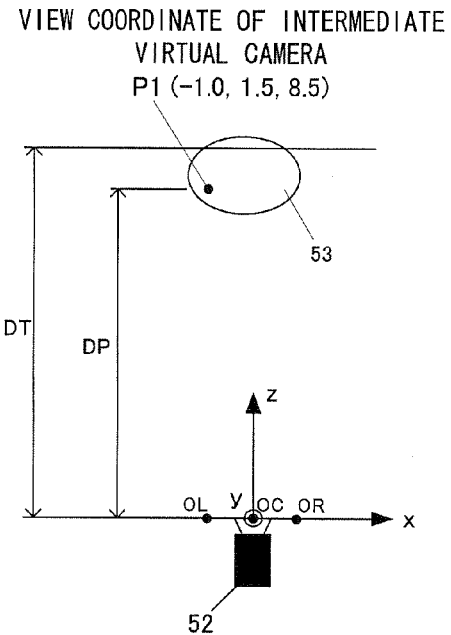
FIG. 13 is a diagram illustrating a non-limiting example of a process at step S15 in FIG. 9.

At step S15, the GPU 312 transforms (view-transforms) the vertex P selected at step S12 into a vertex P1 in the view space of the intermediate virtual camera 52. Here, the z coordinate of the vertex P1 in the view space of the intermediate virtual camera 52 is already calculated by the process at step S13, and thus the GPU 312 performs a process of calculating the x coordinate and the y coordinate of the vertex P1 in the view space of the intermediate virtual camera 52 to perform this view transformation. FIG. 13 is a diagram illustrating the process at step S15. As shown in FIG. 13, the vertex P in the world space shown in FIG. 12(2) is transformed into P1 in the view space of the intermediate virtual camera 52. Hereinafter, a description will be given where, as an example, the coordinate of the vertex P1 is (−1.0, 1.5, 8.5). Then, the processing proceeds to step S16.

Figure 14:
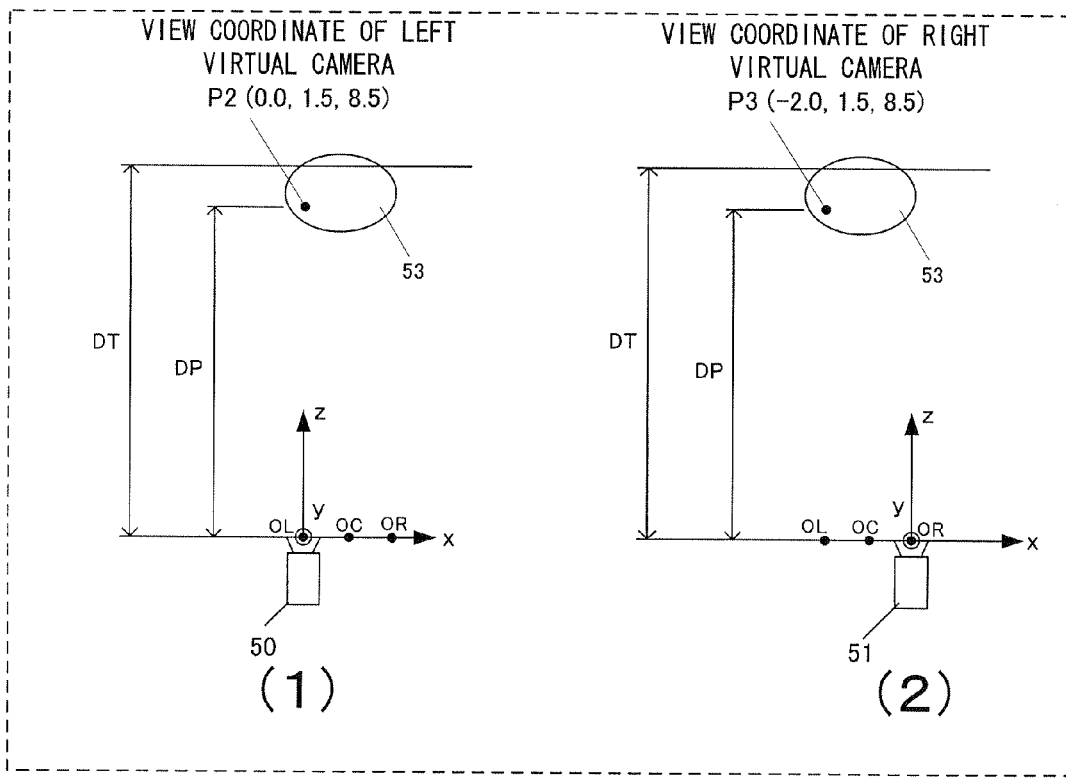
FIG. 14 is a diagram illustrating a non-limiting example of a process at step S16 in FIG. 9.

At step S16, the GPU 312 transforms (view-transforms) the vertex P selected at step S12 into a vertex P2 in a view space of the left virtual camera 50 and transforms (view-transforms) the vertex P into a vertex P3 in a view space of the right virtual camera 51. FIG. 14 is a diagram illustrating the process at step S16. As shown in FIG. 14, the vertex P in the world space shown in FIG. 12(2) is transformed into P2 in the view space of the left virtual camera 50, and the vertex P is transformed into P3 in the view space of the right virtual camera 51. Here, the left virtual camera 50, the right virtual camera 51, and the intermediate virtual camera 52 have the positional relation described with reference to FIG. 10. Thus, the x coordinate value of P2 is higher than the x coordinate value of P1 by a predetermined value (the interval between the left virtual camera 50 and the intermediate virtual camera 52), and the x coordinate value of P3 is lower than the x coordinate value of P1 by a predetermined value (the interval between the left virtual camera 50 and the intermediate virtual camera 52). In the exemplary embodiment, the interval between the left virtual camera 50 and the intermediate virtual camera 52 and the interval between the right virtual camera 51 and the intermediate virtual camera 52 are set to "1.0". When such setting is made, the coordinate of P2 is (0.0, 1.5, 8.5), and the coordinate of P3 is (−2.0, 1.5, 8.5). Then, the processing proceeds to step S17.

At step S17, the GPU 312 interpolates (blends) the vertex P1 obtained at step S15 and the vertex P2 obtained at step S16, with the blend value d to calculate a correction vertex P4 in a view coordinate system of the left virtual camera 50. In addition, at step S17, the GPU 312 interpolates (blends) the vertex P1 obtained at step S15 and the vertex P3 obtained at step S16, with the blend value d to calculate a correction vertex P5 in a view coordinate system of the right virtual camera 51. By so doing, as a result, the degree of projection (the magnitude of the disparity) of the object is alleviated. Hereinafter, a specific description will be given.

Figure 15:
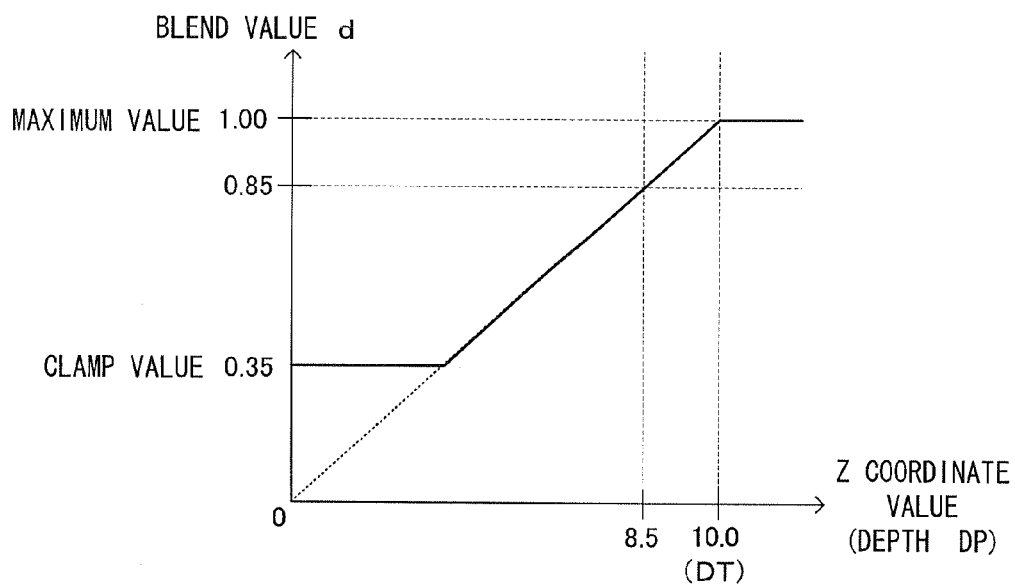
FIG. 15 is a diagram illustrating a non-limiting example of a process at step S17 in FIG. 9.

First, a procedure for calculating the correction vertex P4 in the view coordinate system of the left virtual camera 50 will be described. The GPU 312 determines "0.85" as a blend value d corresponding to the z coordinate value "8.5" of the vertex P1, by using the blend value determination formula (see FIG. 7) indicated by the blend value determination formula data 507, as shown in FIG. 15.

Figure 16:
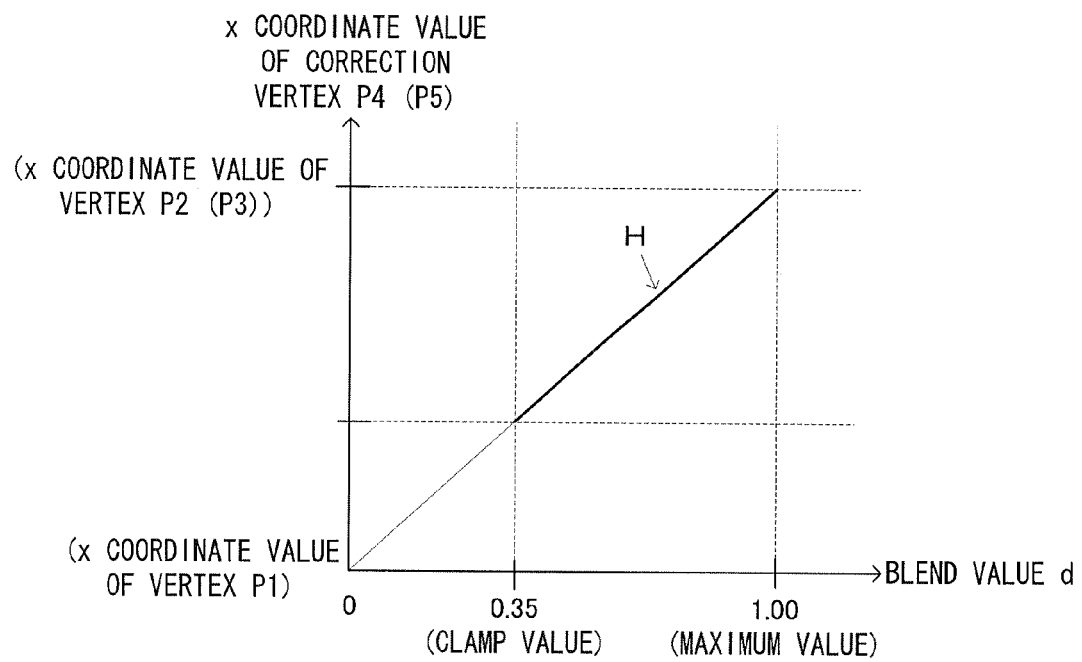
FIG. 16 is a diagram illustrating a non-limiting example of the process at step S17 in FIG. 9.

Here, in accordance with the blend value d, the GPU 312 determines how much degree the x coordinate value of the vertex P2 is corrected to get close to the x coordinate value of the vertex P1. Specifically, the GPU 312 determines the degree of the above correction on the basis of a straight line H shown in FIG. 16. As seen from FIG. 16, when the blend value d is its maximum value "1.00", the GPU 312 determines the x coordinate value of the vertex P2 as the x coordinate value of the correction vertex P4. In other words, no correction is performed. In addition, when the blend value d is a value in a range between its maximum value and its minimum value (the clamp value) "0.35", the GPU 312 determines the x coordinate value of the correction vertex P4 on the basis of the straight line H, such that the x coordinate value gets close to the x coordinate value of the vertex P1 as the blend value d decreases. In other words, the degree of the correction is linearly increased. As shown in FIG. 16, the gradient of the straight line H is such a gradient that the blend value d in reality does not become a value less than the clamp value but if the blend value d becomes "0", the x coordinate value of the vertex P1 is determined as the x coordinate value of the correction vertex P4. The clamp value of the blend value d in the graph shown in FIG. 15 is set to such a value that even when the correction for alleviating the degree of projection (the magnitude of the disparity) of the object is performed, the positional relation among each object in the depth direction is not inverted (changed). The gradient of the straight line in the range from the clamp value to the maximum value of the blend value d in the graph shown in FIG. 15 and the gradient of the straight line H shown in FIG. 16 are set to such gradients that even when the correction for alleviating the degree of projection (the magnitude of the disparity) of the object is performed, the positional relation among each object in the depth direction is not inverted.

Figure 17:
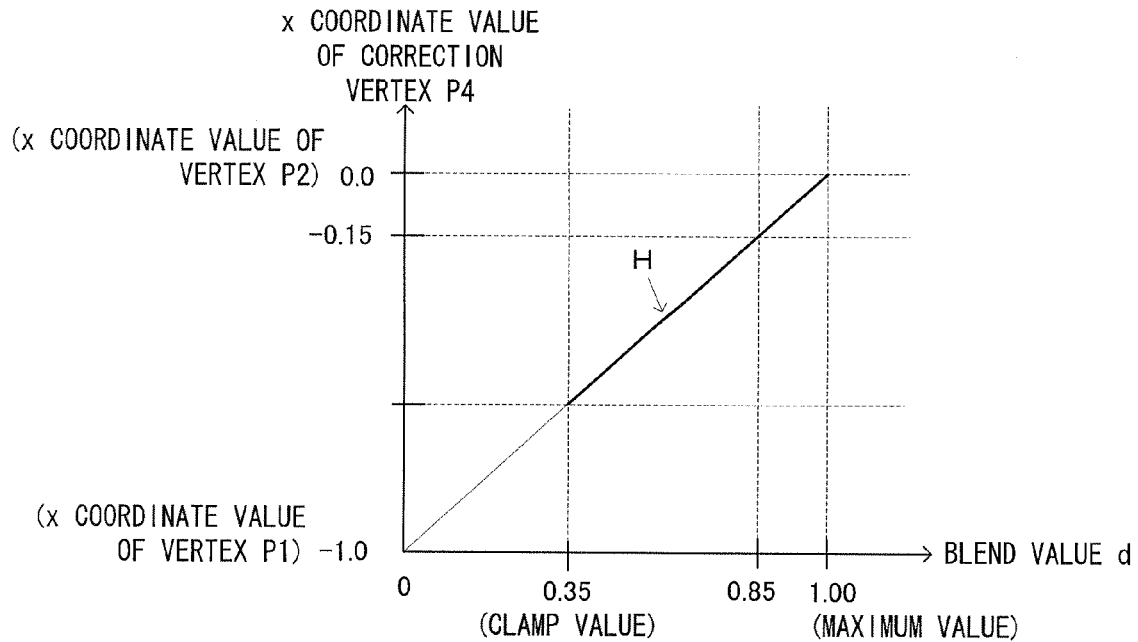
FIG. 17 is a diagram illustrating a non-limiting example of the process at step S17 in FIG. 9.
Figure 19:
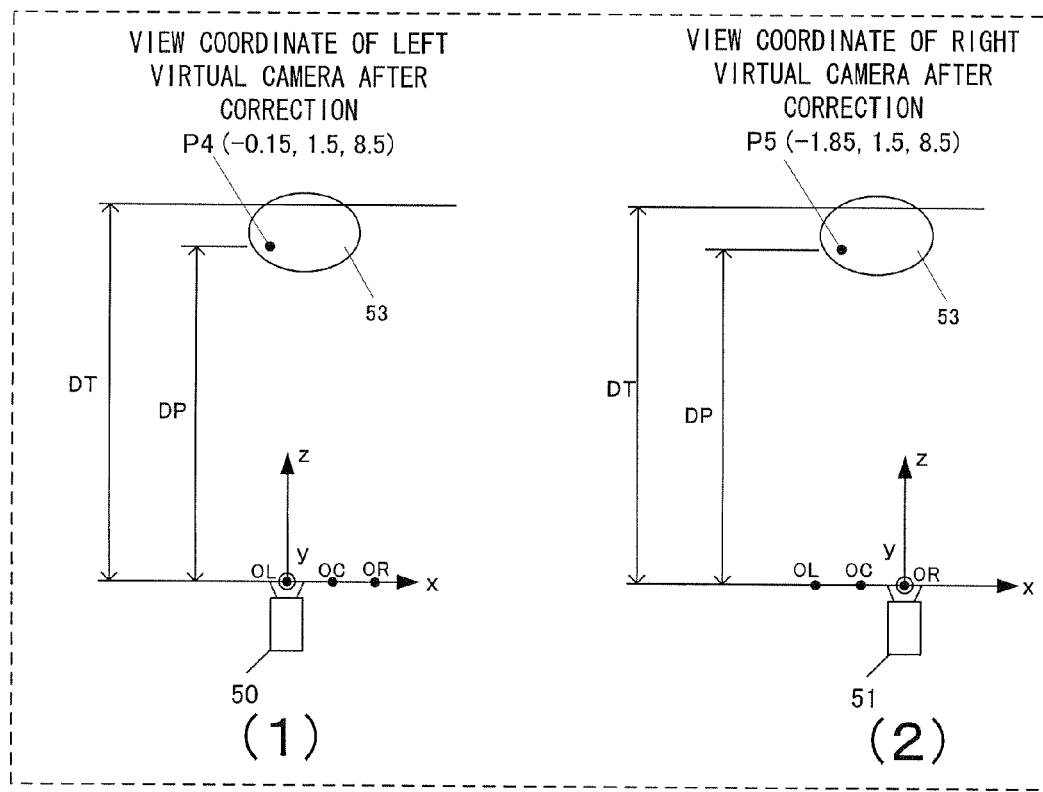
FIG. 19 is a diagram illustrating a non-limiting example of the process at step S17 in FIG. 9.

By using the method described above with reference to FIG. 16, the GPU 312 calculates an x coordinate value of the correction vertex P4 corresponding to a blend value "0.85". In this case, as seen from FIG. 17, the GPU 312 calculates an x coordinate value "−0.15" of the correction vertex P4 corresponding to the blend value "0.85". As a result, the GPU 312 interpolates the vertex P1 (−1.0, 1.5, 8.5) obtained at step S15 and shown in FIG. 13 and the vertex P2 (0.0, 1.5, 8.5) obtained at step S16 and shown in FIG. 14(1), with the blend value d "0.85" to calculate the correction vertex P4 (−0.15, 1.5, 8.5) in the view coordinate system of the left virtual camera 50 as shown in FIG. 19(1). The y coordinate value and the z coordinate value of the vertex P1 are the same as the y coordinate value and the z coordinate value, respectively, of the vertex P2 (namely, they are not corrected). Thus, as the y coordinate value and the z coordinate value of the correction vertex P4, the y coordinate value "1.5" and the z coordinate value "8.5" of the vertex P2 can directly be used.

Next, a procedure for calculating the correction vertex P5 in the view coordinate system of the right virtual camera 51 will be described. The GPU 312 determines "0.85" as a blend value d corresponding to the z coordinate value "8.5" of the vertex P1, by using the blend value determination formula (see FIG. 7) indicated by the blend value determination formula data 507, as shown in FIG. 15.

Figure 18:
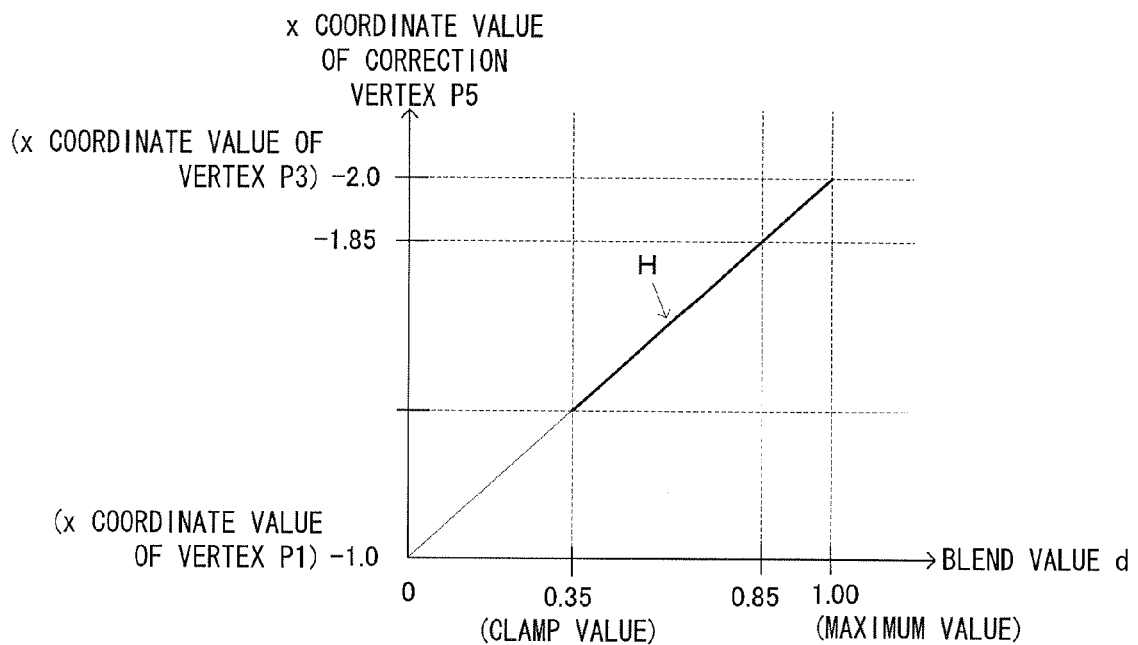
FIG. 18 is a diagram illustrating a non-limiting example of the process at step S17 in FIG. 9.

By using the method described above with reference to FIG. 16, the GPU 312 calculates an x coordinate value of the correction vertex P5 corresponding to the blend value "0.85". In this case, as seen from FIG. 18, the GPU 312 calculates an x coordinate value "−1.85" of the correction vertex P5 corresponding to the blend value "0.85". As a result, the GPU 312 interpolates the vertex P1 (−1.0, 1.5, 8.5) obtained at step S15 and shown in FIG. 13 and the vertex P3 (−2.0, 1.5, 8.5) obtained at step S16 and shown in FIG. 14(2), with the blend value d "0.85" to calculate the correction vertex P5 (−1.85, 1.5, 8.5) in the view coordinate system of the right virtual camera 51 as shown in FIG. 19(2). The y coordinate value and the z coordinate value of the vertex P1 are the same as the y coordinate value and the z coordinate value, respectively, of the vertex P3. Thus, as the y coordinate value and the z coordinate value of the correction vertex P5, the y coordinate value "1.5" and the z coordinate value "8.5" of the vertex P3 can directly be used.

As described above, at step S17, the GPU 312 corrects the vertex P2 (0.0, 1.5, 8.5) shown in FIG. 14(1) to the vertex P4 (−0.15, 1.5, 8.5) shown in FIG. 19(1), in the view coordinate system of the left virtual camera 50. In addition, the GPU 312 corrects the vertex P3 (−2.0, 1.5, 8.5) shown in FIG. 14(2) to the vertex P5 (−1.85, 1.5, 8.5) shown in FIG. 19(2), in the view coordinate system of the right virtual camera 51. By so doing, the difference "2.0" between the x coordinate value (0.0) of the vertex P2 and the x coordinate value (−2.0) of the vertex P3 is decreased to the difference "1.7" between the x coordinate value (−0.15) of the vertex P4 and the x coordinate value (−1.85) of the vertex P5. As a result, the vertex P selected as a processing target at step S12 is displayed on the upper LCD 22 such that the disparity between an image for a left eye and an image for a right eye is alleviated (decreased). In other words, the vertex P in the image for a left eye is corrected so as to move in the leftward direction as seen from the user (see FIGS. 14(1) and 19(1)), and the vertex P in the image for a right eye is corrected so as to move in the rightward direction as seen from the user (see FIGS. 14(2) and 19(2)). By so doing, the disparity in vertex P between the image for a left eye and the image for a right eye is alleviated (decreased). Then, the processing proceeds to step S18.

At step S18, the GPU 312 transforms the coordinate of the correction vertex P4 calculated at step S17 into a screen coordinate in the image for a left eye, and transforms the coordinate of the correction vertex P5 calculated at step S17 into a screen coordinate in the image for a right eye. In other words, the GPU 312 renders the correction vertex P4 on a screen for the image for a left eye and renders the correction vertex P5 on a screen for the image for a right eye. Then, the processing proceeds to step S21.

Meanwhile, at step S19, similarly to step S16, the GPU 312 transforms (view-transforms) the vertex P selected at step S12 into the vertex P2 in the view space of the left virtual camera 50, and transforms (view-transforms) the vertex P into the vertex P3 in the view space of the right virtual camera 51. The process at step S19 is the same as the process at step S16, and thus the description thereof is omitted. Then, the processing proceeds to step S20.

At step S20, the GPU 312 transforms the coordinate of the vertex P2 obtained at step S19 into a screen coordinate in the image for a left eye, and transforms the coordinate of the vertex P3 obtained at step S19 into a screen coordinate in the image for a right eye. In other words, the GPU 312 renders the vertex P2 on the screen for the image for a left eye and renders the vertex P3 on the screen for the image for a right eye. Then, the processing proceeds to step S21.

At step S21, the GPU 312 determines whether or not the processing has been performed on all the vertices constituting the object that is the processing target selected at step S11. When a result of the determination at step S21 is YES, the processing proceeds to step S22. When the result of the determination at step S21 is NO, the processing returns to step S12. When the processing returns to step S12, any one of the unprocessed vertices P is selected at step S12 and the processing is performed on the vertex P.

At step S 22, the GPU 312 determines whether or not the processing has been performed on all objects in the imaging range of the virtual camera. When a result of the determination at step S22 is YES, the coordinate transformation process in FIG. 9 ends and the processing proceeds to step S3 in FIG. 8. When the result of the determination at step S22 is NO, the processing returns to step S11. When the processing returns to step S11, any one of the unprocessed objects is selected at step S11 and the processing is performed on the object. Since the determinations at steps S21 and S22 are performed, the coordinate transformation process is performed on all the objects in the imaging range of the virtual camera.

At step S3 in FIG. 8, the GPU 312 refers to the object data 508, attaches a texture to a large number of polygons constituting each object, on the basis of the vertices on which the coordinate transformation process has been performed at step S2, to generate an image for a left eye and an image for a right eye, and outputs these images to the upper LCD 22. By so doing, a stereoscopic image is displayed on the upper LCD 22. Then, the processing proceeds to step S4.

At step S4, the CPU 311 determines whether or not the game has ended. Specifically, the CPU 311 determines whether or not the game that is progressing in the virtual three-dimensional space has shifted to a predetermined ending state, and determines whether or not the user has performed an operation for ending the game, on the basis of the operation data 501. When the game has shifted to the predetermined ending state or the operation for ending the game has been performed (YES at step S4), the CPU 311 ends the game. On the other hand, when it is determined as NO at step S4, the CPU 311 returns the processing to step S1.

As described above, according to the exemplary embodiment, for an object that is stereoscopically displayed on the upper LCD 22 so as to project toward the user beyond the predetermined position, the correction for decreasing the disparity between an image for a left eye and an image for a right eye is performed, thereby alleviating the degree of the projection. In addition, in the exemplary embodiment, the correction is performed without changing the positional relation among each object in the depth direction between before and after the correction. As a result, the objects are not viewed such that the relation among the objects in the depth direction is inappropriately inverted. Moreover, in the exemplary embodiment, the process for alleviating a disparity is performed on each vertex forming the object. Thus, for example, even when a large object (an object having a large depth) is displayed so as to greatly project, natural correction can be performed. Due to the above, according to the exemplary embodiment, stereoscopic display that is easily viewed can be implemented.

(Modifications)

In the exemplary embodiment described above, as described with reference to FIG. 12, as an example, the case has been described where the depth threshold DT is a value indicating the depth of the position on the near side (the intermediate virtual camera 52 side) of the position (D0) viewed on the display surface (the display surface of the upper LCD 22). However, the depth threshold DT may be a value indicating the depth of a position on the far side of the position viewed on the display surface (the display surface of the upper LCD 22), or may be a value indicating the depth of the position viewed on the display surface.

In the exemplary embodiment described above, as described with reference to FIG. 15, the relation between the blend value d and the depth DP has been described as a linear relation. However, this relation may not be a linear relation, unless the positional relation among each object in the depth direction is not inverted (changed) even when the correction for alleviating the degree of projection (the magnitude of the disparity) of the object is performed. In addition, in the exemplary embodiment described above, as described with reference to FIG. 16, the relation between the blend value d and the degree of the correction has been described as a linear relation (the straight line H). However, this relation may not be a linear relation, unless the positional relation among each object in the depth direction is not inverted (changed) even when the correction for alleviating the degree of projection (the magnitude of the disparity) of the object is performed.

Figure 20:
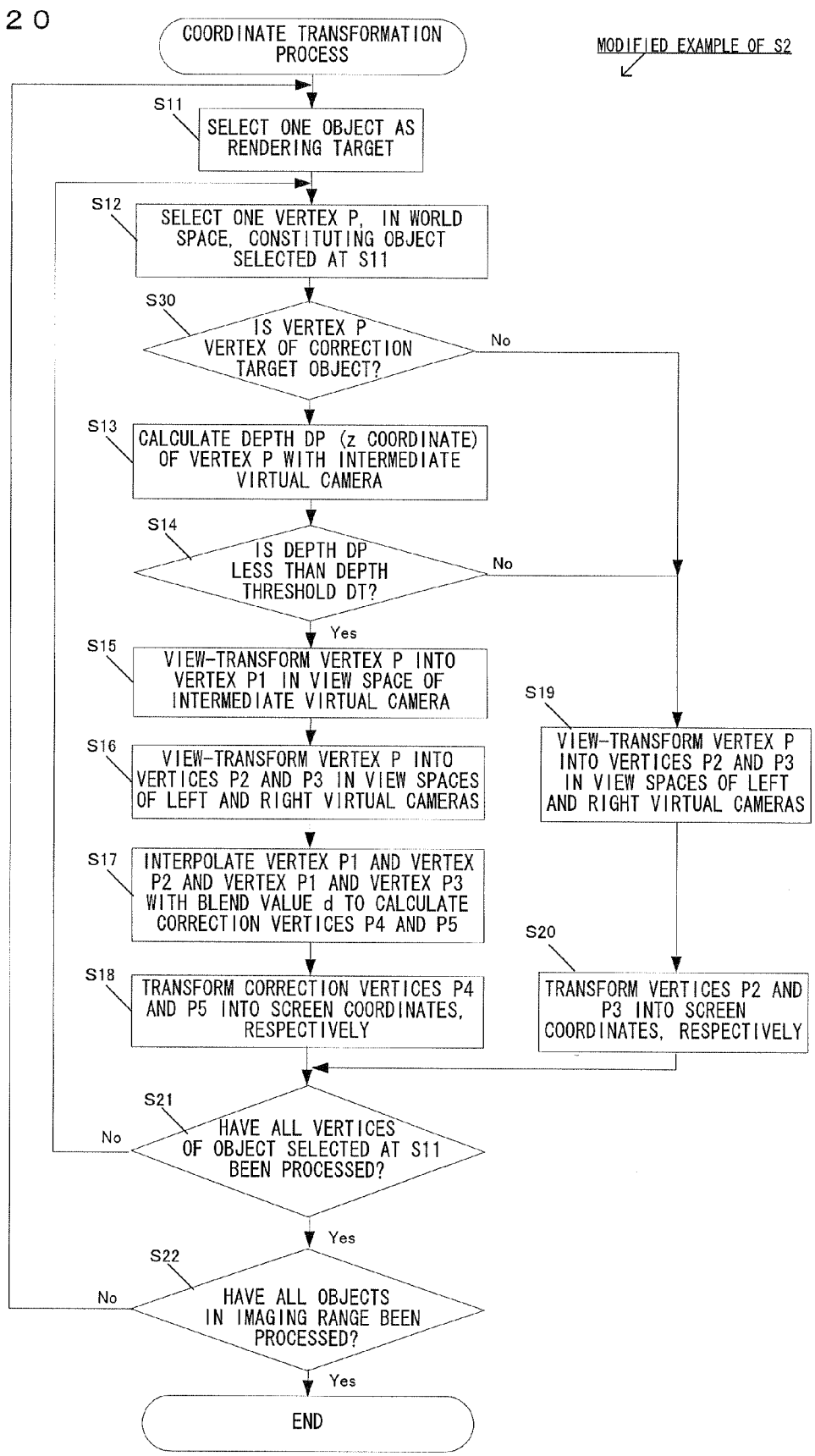
FIG. 20 is another non-limiting example of the flowchart of the coordinate transformation process at step S2 in FIG. 8.

In the exemplary embodiment described above, as described at step S1 in FIG. 8, in order to prevent the predetermined object (the player object or the like) from being a target for the process for alleviating a disparity (the processes at steps S15 to S18 in FIG. 9), the positional relation between the predetermined object and the virtual camera is controlled such that the predetermined object is spaced apart from the virtual camera by the predetermined distance (the depth threshold DT) or more. However, such a process may not be performed at step S1 in FIG. 8 but may be performed in the coordinate transformation process (see FIG. 9) at step S2 in FIG. 8 to prevent the predetermined object from being a target for the process for alleviating a disparity. Specifically, as shown in FIG. 20, the coordinate transformation process at step S2 in FIG. 8 may be modified. In a flowchart of FIG. 20, step S30 is added between steps S12 and S13 in the flowchart of FIG. 9. At step S30 in FIG. 20, the GPU 312 determines whether or not the vertex P selected at step S12 is a vertex of an object that is a correction target and is not the predetermined object (the player object or the like). When a result of the determination is YES, the processing proceeds to step S12 and the correction process is performed. On the other hand, when the result of the determination is NO, the processing proceeds to step S19 and the correction process is not performed.

In the exemplary embodiment described above, the stereoscopic image displayed on the upper LCD 22 has been described as an image that is stereoscopically visible with naked eyes. However, it suffices that a stereoscopically visible image is displayed on the upper LCD 22, and for example, an image that is stereoscopically visible by the player through glasses for stereoscopic view that are worn by the player (namely, an image in which an image for a left eye and an image for a right eye are displayed alternately in a time division manner) may be displayed.

In the exemplary embodiment described above, by the process at step S17 in FIG. 9, the positions of the rendering target object (the vertex of the rendering target object) in the image for a left eye and the image for a right eye are corrected. However, only either one of the positions of the rendering target object (the vertex of the rendering target object) in the image for a left eye and the image for a right eye may be corrected.

In the exemplary embodiment described above, as described with reference to FIG. 10, the region 75 of the image 70L rendered by the left virtual camera 50 is cut out and displayed as an image for a left eye on the upper LCD 22, and the region 75 of the image 70R rendered by the right virtual camera 51 is cut out and displayed on an image for a right eye on the upper LCD 22. However, as shown in FIG. 21, the rendering region of the left virtual camera 50 may previously be set such that the image 70L rendered by the left virtual camera 50 coincides with the region 75, and the rendering region of the right virtual camera 51 may previously be set such that the image 70R rendered by the right virtual camera 51 coincides with the region 75. In such a case, unlike the case of FIG. 10, the process of cutting out the region 75 after rendering does not have to be performed.

In the exemplary embodiment described above, the imaging direction of the left virtual camera 50 is the same as the imaging direction of the right virtual camera 51. However, the imaging direction of the left virtual camera 50 and the imaging direction of the right virtual camera 51 may not be the same and may be directions therefrom toward an imaging target object (to be precise, a processing target vertex constituting the object), respectively.

In the exemplary embodiment described above, the game apparatus 10 has been described as an example. However, the exemplary embodiments disclosed herein are not limited to application to the game apparatus 10. For example, the exemplary embodiments disclosed herein are also applicable to portable information terminal apparatuses such as a mobile phone, a personal handyphone system (PHS), and a PDA. In addition, the exemplary embodiments disclosed herein are also applicable to a stationary game apparatus, a personal computer, and the like.

In the exemplary embodiment described above, the above processing is performed on the single game apparatus 10. However, the above processing may be performed using a plurality of apparatuses that can communicate with each other in a wired or wireless manner.

In the exemplary embodiment described above, the shape of the game apparatus 10, the shapes, the number, and the installed positions of the various operation buttons 14, the analog stick 15, and the touch panel 13, and the like are merely examples. It is understood that the exemplary embodiments disclosed herein can be implemented with other shapes, numbers and installed positions. The order of the process steps, the set values, the values used for the determinations, and the like which are used in the information processing described above are merely examples. It is understood that the exemplary embodiments disclosed herein can be implemented with other order of process steps and other values.

The various information processing programs executed on the game apparatus 10 of the exemplary embodiment described above may be provided to the game apparatus 10 through not only a storage medium such as the external memory 44 but also through a wired or wireless communication line. Alternatively, the programs may be previously stored in a nonvolatile storage unit (the internal data storage memory 35 or the like) provided in the game apparatus 10. It should be noted that an information storage medium for storing the programs may be a nonvolatile memory as well as a CD-ROM, a DVD, a like optical disc-shaped storage media, a flexible disc, a hard disc, a magneto-optical disc, a magnetic tape, and the like. Further, an information storage medium for storing the programs may be a volatile memory that temporarily stores the programs.

While the image processing system, the storage medium, the image processing method, and the image processing apparatus have been described herein, it is to be understood that the appended claims are not to be limited to the image processing system, the storage medium, the image processing method, and the image processing apparatus disclosed, but on the contrary, are intended to cover various modifications and equivalent arrangements included within the spirit and scope of the appended claims.

What is claimed is:

1. An image processing system for generating a stereoscopic image that is stereoscopically visible, the image processing system comprising one or more computer processors configured to perform at least:

stereoscopic image generation by taking images of a virtual three-dimensional space in which an object is located, with a virtual camera, generating a stereoscopic image that is composed of an image for a left eye and an image for a right eye between which a disparity is provided; and display control by causing a display section to display the generated stereoscopic image, the stereoscopic image generation performing correction of decreasing a disparity of the object, wherein in generating the stereoscopic image, the stereoscopic image generation performs correction of decreasing a disparity of an object in accordance with a distance from the virtual camera to the object, wherein in generating the stereoscopic image, the stereoscopic image generation performs correction of more greatly decreasing the disparity of the object when the distance from the virtual camera to the object is shorter such that the positional relation among different objects in the depth direction is not inverted, wherein in generating the stereoscopic image, the stereoscopic image generation performs at least one of a correction of moving a position of the object in the image for a left eye in a leftward direction as seen from a user, and correction of moving a position of the object in the image for a right eye in a rightward direction as seen from the user, thereby performing correction of decreasing the disparity of the object, and wherein in generating the stereoscopic image, by using a left virtual camera for taking the image for a left eye, a right virtual camera for taking the image for a right eye, and an intermediate virtual camera located between the left virtual camera and the right virtual camera, the stereoscopic image generation performs at least one of a correction of adjusting a position of an object in the image for a left eye such that the position is located between a position based on the left virtual camera and a position based on the intermediate virtual camera, and a correction of adjusting a position of the object in the image for a right eye such that the position is located between a position based on the right virtual camera and the position based on the intermediate virtual camera, thereby performing correction of decreasing the disparity of the object.

2. The image processing system according to claim 1, wherein in generating the stereoscopic image, the stereoscopic image generator performs at least one of a correction of adjusting the position of the object in the image for a left eye such that the position is an interpolation position obtained by interpolating the position based on the left virtual camera and the position based on the intermediate virtual camera in accordance with distances from both virtual cameras to the object, and a correction of adjusting the position of the object in the image for a right eye such that the position is an interpolation position obtained by interpolating the position based on the right virtual camera and the position based on the intermediate virtual camera in accordance with distances from both virtual cameras to the object, thereby performing correction of decreasing the disparity of the object.

3. The image processing system according to claim 1, wherein in generating the stereoscopic image, the stereoscopic image generator renders the object with the virtual camera after a relative position of the object with respect to the virtual camera is corrected, thereby performing correction of decreasing the disparity of the object.

4. The image processing system according to claim 3, wherein in generating the stereoscopic image, the stereoscopic image generator renders the object with the virtual camera after a position of the object in a view coordinate system of the virtual camera is corrected, thereby performing correction of decreasing the disparity of the object.

5. The image processing system according to claim 3, wherein in generating the stereoscopic image, the stereoscopic image generator renders the object with the virtual camera after the relative position of the object with respect to the virtual camera is corrected only in a right-left direction as seen from the virtual camera, thereby performing correction of decreasing the disparity of the object.

6. The image processing system according to claim 3, wherein
in generating the stereoscopic image, the stereoscopic image generator renders the object with a left virtual camera and a right virtual camera after at least either one of a relative position of the object with respect to the left virtual camera or a relative position of the object with respect to the right virtual camera is corrected, thereby performing correction of decreasing the disparity of the object.

7. The image processing system according to claim 6, wherein
a direction of correction of the relative position of the object with respect to the left virtual camera is different from a direction of correction of the relative position of the object with respect to the right virtual camera.

8. The image processing system according to claim 3, wherein
in generating the stereoscopic image, the stereoscopic image generator temporarily corrects the relative position of the object with respect to the virtual camera for rendering the object with the virtual camera, and performs correction of decreasing the disparity of the object.

9. The image processing system according to claim 1, wherein
in generating the stereoscopic image, by using a left virtual camera for taking the image for a left eye, a right virtual camera for taking the image for a right eye, and an intermediate virtual camera located between the left virtual camera and the right virtual camera, when generating the image for at least one of left eye and a right eye, the stereoscopic image generation interpolates a relative position of an object with respect to the left virtual camera and a relative position of the object with respect to the intermediate virtual camera in accordance with distances from both virtual cameras to the object to calculate an interpolation position, and renders the object with the left virtual camera using the interpolation position, and the stereoscopic image generation interpolates a relative position of the object with respect to the right virtual camera and the relative position of the object with respect to the intermediate virtual camera in accordance with distances from both virtual cameras to the object to calculate an interpolation position, and renders the object with the right virtual camera using the interpolation position, thereby performing correction of decreasing the disparity of the object.

10. The image processing system according to claim 9, wherein
when generating the image for at least one of a left eye and a right eye, the stereoscopic image generator interpolates a relative coordinate of each vertex of an object with respect to the left virtual camera and a relative coordinate of each vertex of the object with respect to the intermediate virtual camera in accordance with distances from both virtual cameras to each vertex to calculate an interpolation coordinate, and renders each vertex with the left virtual camera using the interpolation coordinate, and the stereoscopic image generation interpolates a relative coordinate of each vertex of the object with respect to the right virtual camera and the relative coordinate of each vertex of the object with respect to the intermediate virtual camera in accordance with distances from both virtual cameras to each vertex to calculate and interpolation coordinate, and renders each vertex with the right virtual camera using the interpolation coordinate, thereby performing correction of decreasing a disparity of each vertex of the object.

11. The image processing system according to claim 1, wherein
in generating the stereoscopic image, the stereoscopic image generator performs correction of decreasing a disparity of each vertex constituting an object, in accordance with a distance from the virtual camera to each vertex.

12. The image processing system according to claim 1, wherein
in generating the stereoscopic image, the stereoscopic image generator does not decrease a disparity of an object any more when a distance from the virtual camera to the object is shorter than a predetermined distance.

13. The image processing system according to claim 1, wherein
in generating the stereoscopic image, the stereoscopic image generator does not perform correction of decreasing a disparity of an object when a distance from the virtual camera to the object is longer than a predetermined distance.

14. The image processing system according to claim 1, wherein
in generating the stereoscopic image, the stereoscopic image generator performs the correction only on an object that is a correction target.

15. A non-transitory computer-readable storage medium having stored therein an image processing program executed by a computer of an image processing system for generating a stereoscopic image that is stereoscopically visible, the image processing program causing the computer to perform at least:
stereoscopic image generator configured to take images of a virtual three-dimensional space in which an object is located, with a virtual camera,
generating a stereoscopic image that is composed of an image for a left eye and an image for a right eye between which a disparity is provided; and
display control by causing a display section to display the generated stereoscopic image, the stereoscopic image generation performing correction of decreasing a disparity of the object, wherein
in generating the stereoscopic image, the stereoscopic image generator performs correction of decreasing a disparity of an object in accordance with a distance from the virtual camera to the object, wherein
in generation the stereoscopic image, the stereoscopic image generation performs correction of more greatly decreasing the disparity of the object when the distance from the virtual camera to the object is shorter such that the positional relation among different objects in the depth direction is not inverted, wherein
in generating the stereoscopic image, the stereoscopic image generation performs at least one of a correction of moving a position of the object in the image for a left eye in a leftward direction as seen from a user, and correction of moving a position of the object in the image for a right eye in a rightward direction as seen from the user, thereby performing correction of decreasing the disparity of the object, and wherein
in generating the stereoscopic image, by using a left virtual camera for taking the image for a left eye, a right virtual camera for taking the image for a right eye, and an intermediate virtual camera located between the left virtual camera and the right virtual camera, the stereoscopic image generation performs at least one of a correction of adjusting a position of an object the image for a left eye such that the position is located between a position based on the left virtual camera and a position based on the intermediate virtual camera, and a correction of adjusting a position of the object in the image for a right eye such that the position is located between a position based on the right virtual camera and the position based on the intermediate virtual camera, thereby performing correction of decreasing the disparity of the object.

16. An image processing method for generating a stereoscopic image that is stereoscopically visible, the image processing method comprising:

taking images of a virtual three-dimensional space in which an object is located, with a virtual camera, generating a stereoscopic image that is composed of an image for a left eye and an image for a right eye between which a disparity is provided; and causing a display to display the generated stereoscopic image, wherein in generating the stereoscopic image, performing correction of decreasing a disparity of the object at the stereoscopic image generating, wherein.

in generating the stereoscopic image, the stereoscopic image generation performs correction of decreasing a disparity of an object in accordance with a distance from the virtual camera to the object, wherein in generating the stereoscopic image, the stereoscopic image generation performs correction of more greatly decreasing the disparity of the object when the distance from the virtual camera to the object is shorter such that the positional relation among different objects in the depth direction is not inverted, and wherein in generating the stereoscopic image, by using a left virtual camera for taking the image for a left eye, a right virtual camera for taking the image for a right eye, and intermediate virtual camera located between the left virtual camera and the right virtual camera, when generating the image for at least one of a left eye and a right eye, the stereoscopic image generation interpolates a relative position of an object with respect to the left virtual camera and a relative position of the object with respect to the intermediate virtual camera in accordance with distances from both virtual cameras to the object to calculate an interpolation position, and renders the object with the left virtual camera using the interpolation position, and the stereoscopic image generation interpolates a relative position of the object with respect to the right virtual camera and the relative position of the object with respect to the intermediate virtual camera in accordance with distances from both virtual cameras to the object to calculate an interpolation position, and renders the object with the right virtual camera using the interpolation position, thereby performing correction of decreasing the disparity of the object.

17. An image processing apparatus for generating a stereoscopic image that is stereoscopically visible, the image processing apparatus comprising one or more computer processors configured to perform at least:

stereoscopic image generator configured to take images of a virtual three-dimensional space in which an object is located, with a virtual camera, and to generate a stereoscopic image that is composed of an image for a left eye and an image for a right eye between which a disparity is provided; and display controller configured to cause a display section to display the stereoscopic image the stereoscopic image generated performing correction of decreasing a disparity of the object, wherein the stereoscopic image generation performs correction of decreasing a disparity of an object in accordance with a distance from the virtual camera to the object, wherein the stereoscopic image generation performs correction of more greatly decreasing the disparity of the object when the distance from the virtual camera to the object is shorter such that the positional relation among different objects in the depth direction is not inverted, and wherein in generating the stereoscopic image, by using a left virtual camera for taking the image for a left eye, a right virtual camera for taking the image for a right eye, and an intermediate virtual camera, located between the left virtual camera and the right virtual camera, when generating the image for at least one of a left eye and a right eye, the stereoscopic image generation interpolates a relative position of an object with respect to the left virtual camera and a relative position of the object with respect to the intermediate virtual camera in accordance with distances from both virtual cameras to the object to calculate an interpolation position, and renders the object with the left virtual camera using the interpolation position, and the stereoscopic image generation interpolates a relative position of the object with respect to the right virtual camera and the relative position of the object with respect to the intermediate virtual camera in accordance with distances from both virtual cameras to the object to calculate an interpolation position, and renders the object with the right virtual camera using the interpolation position, thereby performing correction of decreasing the disparity of the object.

* * * * *